US012656833B2

(12) United States Patent
Seo et al.

(10) Patent No.: US 12,656,833 B2
(45) Date of Patent: Jun. 16, 2026

(54) DISPLAY DEVICE WITH EXTENDED MODE

(71) Applicant: Samsung Display Co., Ltd., Yongin-si (KR)

(72) Inventors: Eunwon Seo, Yongin-si (KR); Joon-Ik Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 354 days.

(21) Appl. No.: 18/329,727

(22) Filed: Jun. 6, 2023

(65) Prior Publication Data

US 2024/0094778 A1    Mar. 21, 2024

(30) Foreign Application Priority Data

Sep. 15, 2022    (KR) ........................ 10-2022-0116391

(51) Int. Cl.
    *G06F 1/16*        (2006.01)
    *H04M 1/02*        (2006.01)
(52) U.S. Cl.
    CPC .......... *G06F 1/1656* (2013.01); *G06F 1/1652* (2013.01); *H04M 1/0268* (2013.01)
(58) Field of Classification Search
    CPC .. G06F 1/1656; G06F 1/1652; H04M 1/0268; H04M 1/0235; G09F 9/301; H10K 50/84; H10K 2102/311
    See application file for complete search history.

(56) References Cited

U.S. PATENT DOCUMENTS

| | | | |
|---|---|---|---|
| 10,175,792 B2 | 1/2019 | Kim et al. | |
| 10,314,184 B2 * | 6/2019 | Choi ...................... | G06F 1/1616 |
| 10,321,583 B2 * | 6/2019 | Seo .......................... | H04N 5/64 |
| 10,331,173 B2 * | 6/2019 | Cho ........................ | G06F 1/1652 |
| 10,705,569 B2 * | 7/2020 | Lin .......................... | H01F 7/064 |
| 10,743,428 B2 | 8/2020 | Cho | |
| 10,963,014 B1 * | 3/2021 | Park ...................... | G06F 1/1652 |
| 10,993,338 B2 * | 4/2021 | Cha ........................ | G06F 1/1616 |
| 11,868,185 B2 * | 1/2024 | Wang ........................ | G09F 9/30 |
| 2016/0231843 A1 * | 8/2016 | Kim ...................... | G06F 1/1652 |
| 2017/0013726 A1 * | 1/2017 | Han ...................... | H05K 7/1427 |
| 2017/0208157 A1 * | 7/2017 | Kim .................... | H04M 1/0268 |
| 2017/0270835 A1 * | 9/2017 | Yang .................... | H10K 77/111 |
| 2018/0059734 A1 * | 3/2018 | Knoppert .............. | G06F 1/1616 |

(Continued)

FOREIGN PATENT DOCUMENTS

| | | |
|---|---|---|
| KR | 10-2020-0084980 | 7/2020 |
| KR | 10-2021-0083442 | 7/2021 |

(Continued)

*Primary Examiner* — Rockshana D Chowdhury
(74) *Attorney, Agent, or Firm* — Sughrue Mion, PLLC

(57)    ABSTRACT

A display device includes a display module and a plurality of support bars disposed on the display module and spaced apart from each other by a gap. Each of the plurality of support bars includes a body including a first surface in contact with the display module, a second surface opposite to the first surface, and a third surface and a fourth surface that connect the first surface and the second surface and that are opposite to each other and being inclined from the first surface and the second surface, and a magnet disposed on the third surface or the fourth surface. Magnets of adjacent support bars of the plurality of support bars are disposed to generate a repulsive force therebetween.

19 Claims, 21 Drawing Sheets

(56)                    References Cited

U.S. PATENT DOCUMENTS

| | | | | |
|---|---|---|---|---|
| 2018/0107250 | A1* | 4/2018 | Cho ..................... | H10K 77/111 |
| 2019/0286195 | A1* | 9/2019 | Lin ..................... | H04M 1/0268 |
| 2020/0253068 | A1* | 8/2020 | Cha ..................... | H05K 5/0226 |
| 2021/0200273 | A1 | 7/2021 | Hong et al. | |
| 2022/0058993 | A1* | 2/2022 | Zhao ................... | H04M 1/0268 |
| 2022/0078270 | A1* | 3/2022 | Song ................... | H04M 1/0268 |
| 2022/0240402 | A1* | 7/2022 | Choi ........................ | H05K 5/03 |
| 2022/0253103 | A1* | 8/2022 | Choi ..................... | G06F 1/1624 |
| 2022/0317732 | A1* | 10/2022 | Lee ........................ | G06F 1/1643 |
| 2022/0400562 | A1* | 12/2022 | Wang ................... | G06F 1/1652 |
| 2024/0306326 | A1* | 9/2024 | Wan ..................... | H05K 5/0217 |
| 2024/0310876 | A1* | 9/2024 | Zhao ..................... | G06F 1/1656 |

FOREIGN PATENT DOCUMENTS

| | | |
|---|---|---|
| KR | 10-2021-0130299 | 11/2021 |
| KR | 10-2398162 | 5/2022 |

* cited by examiner

DISPLAY DEVICE WITH EXTENDED MODE

CROSS-REFERENCE TO RELATED APPLICATION(S)

This application claims priority to and benefits of Korean Patent Application No. 10-2022-0116391 under 35 U.S.C. § 119, filed on Sep. 15, 2022, in the Korean Intellectual Property Office, the entire contents of which are incorporated herein by reference.

BACKGROUND

1. Technical Field

Embodiments relate to a display device for improving surface quality of a display module.

2. Description of the Related Art

Electronic devices, such as a smart phone, a digital camera, a notebook computer, a car navigation device, a smart television, and the like, which display an image to a user, include a display device for displaying an image. The display device generates an image and displays the image to the user through a display screen.

Recently, with the development of display device technology, various forms of display devices have been developed. For example, various flexible display devices, which are curved, folded, or rolled, have been developed. The flexible display devices may be easily carried and may improve user convenience.

A flexible display device includes a flexible display module. The flexible display module is accommodated in a case and is extended by being withdrawn from the case to the outside as needed. A support part for supporting the flexible display module withdrawn to the outside is attached to a rear surface of the flexible display module.

SUMMARY

Embodiments provide a display device for improving surface quality of a display module.

However, embodiments of the disclosure are not limited to those set forth herein. The above and other embodiments will become more apparent to one of ordinary skill in the art to which the disclosure pertains by referencing the detailed description of the disclosure given below.

According to an embodiment, a display device may include a display module and a plurality of support bars disposed on the display module and spaced apart from each other by a gap. Each of the plurality of support bars includes a body including a first surface in contact with the display module, a second surface opposite to the first surface, and a third surface and a fourth surface opposite to each other, the third surface and the fourth surface that connect the first surface and the second surface and that are inclined from the first surface and the second surface, and a magnet disposed on the third surface or the fourth surface. Magnets of adjacent support bars of the plurality of support bars may be disposed to generate a repulsive force.

The magnet of one of the adjacent support bars and the magnet of another one of the adjacent support bars may have a same magnetism.

The magnet of the one of the adjacent support bars may include a first magnet disposed on the third surface and a second magnet disposed on the fourth surface. The first magnet may be disposed in a first groove defined on the third surface, and the second magnet may be disposed in a second groove defined on the fourth surface.

The first magnet may include a first magnetic body and a second magnetic body spaced apart from each other in an extension direction of the third surface, and the second magnet may include a third magnetic body and a fourth magnetic body spaced apart from each other in an extension direction of the fourth surface.

A gap between the third surface and the fourth surface may vary as being farther away from the display module.

The third surface or the fourth surface may form a right angle or an obtuse angle with the second surface.

The third surface may include a first connecting part connected to the second surface and a second connecting part connecting the first connecting part and the first surface and bent. The fourth surface may include a third connecting part connected to the second surface and a fourth connecting part connecting the third connecting part and the first surface and being inclined from the third connecting part.

The display device may further include a support film disposed between the display module and the plurality of support bars.

The display device may further include a support plate disposed on the display module and disposed to be adjacent to the plurality of support bars.

According to an embodiment, a display device may include a display module, a support plate disposed under the display module, a plurality of support bars disposed under the display module and disposed to be adjacent to the support plate, and spaced apart from each other; a first case that accommodates the display module, the support plate, and the plurality of support bars, and a second case coupled with the first case to move away from or toward the first case in a direction intersecting an extension direction of the plurality of support bars. The plurality of support bars include a first support bar and a second support bar adjacent to each other. The first support bar may include a first side facing the second support bar, and the second support bar may include a second side facing the first support bar. The first side and the second side are defined to generate a repulsive force therebetween.

The plurality of support bars may further include a third support bar spaced apart from the first support bar with the second support bar disposed between the first support bar and the third support bar. The second support bar may further include a third side opposite to the second side and facing the third support bar. The third support bar may include a fourth side that faces the second support bar. The third side and the fourth side may be defined to generate a repulsive force therebetween.

The first side and the second side may have a same magnetism, and the third side and the fourth side may have a same magnetism.

Opposite sides of each of the plurality of support bars may be inserted into first guide grooves formed on inside surfaces of the first case facing each other in the extension direction of the plurality of support bars, and the plurality of support bars may be moveable along the first guide grooves.

Each of the first guide grooves may include a first extension groove portion that extends in the direction intersecting the extension direction of the plurality of support bars, a second extension groove portion that extends in the direction and that is disposed under the first extension groove portion, and a curved groove portion that extends from the first extension groove portion to the second extension groove portion.

The support plate may be connected to the second case, opposite sides of the support plate may be inserted into the first extension groove portions of the first guide grooves, and the opposite sides of each of the plurality of support bars may be inserted into the curved groove portions and the second extension groove portions of the first guide grooves.

The display device may further include a roller coupled to the inside of the first case and being rotatable, and the roller may be disposed between the first extension groove portion and the second extension groove portion and may be rotatable with being in contact with the plurality of support bars.

The display device may further include a support film disposed between the display module and the plurality of support bars.

According to an embodiment, a display device includes a display module including a first portion, a second portion disposed under the first portion, and a third portion disposed between the first portion and the second portion and bent, a support plate disposed on a rear surface of the first portion, a plurality of support bars disposed on a rear surface of the second portion and a rear surface of the third portion and spaced apart from each other by a gap, a first case that accommodates the display module, the support plate, and the plurality of support bars, and a second case coupled with the first case to move away from or toward the first case in a direction intersecting an extension direction of the plurality of support bars. Adjacent support bars of the plurality of support bars may be defined to generate a repulsive force.

Each of the plurality of support bars may include a body including a first surface in contact with the display module, a second surface opposite to the first surface, and a third surface and a fourth surface that connect the first surface and the second surface and that are inclined from the first surface and the second surface, and a magnet disposed on the third surface or the fourth surface. A magnet of one of the adjacent support bars and a magnet of another one of the adjacent support bars may face each other and may have a same magnetism.

A gap between the third surface and the fourth surface may vary as being farther away from the display module.

BRIEF DESCRIPTION OF THE DRAWINGS

The above and other objects and features of the disclosure will become apparent by describing in detail embodiments thereof with reference to the accompanying drawings.

FIG. 11 is a schematic sectional view taken along line II-II' illustrated in FIG. 9.

FIG. 20 is a schematic view illustrating the extended mode of the display device illustrated in FIG. 17.

DETAILED DESCRIPTION OF THE EMBODIMENTS

Figure 1:
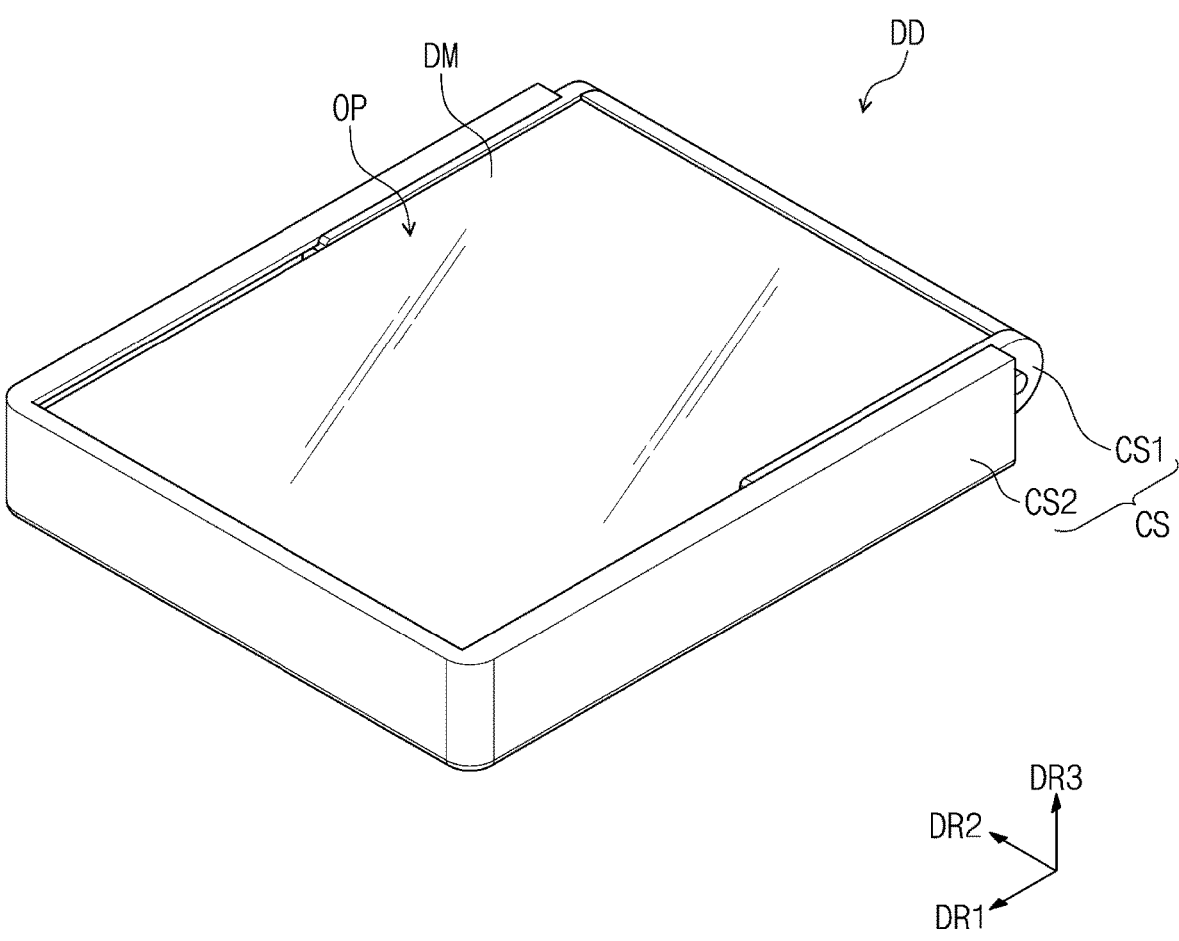
FIG. 1 is a schematic perspective view of a display device according to an embodiment.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the invention.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the X, Y, and Z-axes, and may be interpreted in a broader sense. For example, the DR1-axis, the DR2-axis, and the DR3-axis may be perpendicular to one another, or may represent different directions that are not perpendicular to one another. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of A and B" may be construed as understood to mean A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures.

As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the invention. Further, the blocks, units, and/or modules of some embodiments may be physically combined into more complex blocks, units, and/or modules without departing from the scope of the invention.

Hereinafter, embodiments will be described with reference to the accompanying drawings.

Figure 2:
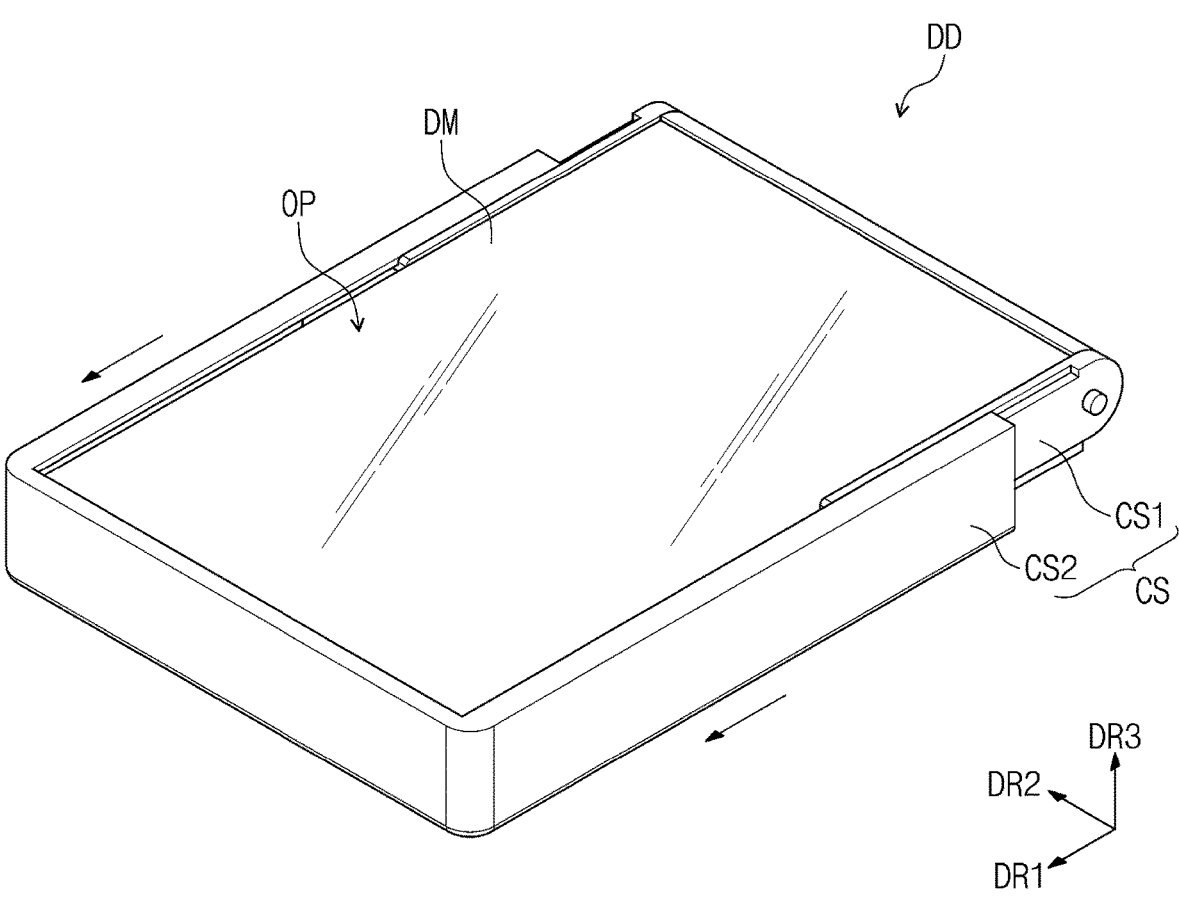
FIG. 2 is a schematic view for describing an extended mode of the display device illustrated in FIG. 1.

FIG. 1 is a schematic perspective view of a display device according to an embodiment. FIG. 2 is a schematic view for describing an extended mode of the display device illustrated in FIG. 1.

Referring to FIG. 1, the display device DD according to an embodiment may include a display module DM and a case CS in which the display module DM is accommodated. The display module DM may be exposed to the outside through an opening OP defined at the top of the case CS.

The case CS may include a first case CS1 and a second case CS2 that are coupled to each other and that accommodate the display module DM. The second case CS2 may be coupled to the first case CS1 to move in a first direction DR1. Detailed description of the first and second cases CS1 and CS2 will be provided below.

A direction intersecting the first direction DR1 may be defined as a second direction DR2, and a direction substantially perpendicular to a plane defined by the first and second directions DR1 and DR2 may be defined as a third direction DR3. As used herein, the expression "when viewed in a plan view" may mean that it is viewed in the third direction DR3.

Referring to FIGS. 1 and 2, the second case CS2 may move away from or toward the first case CS1 in the first direction DR1. In case that the second case CS2 moves in the first direction DR1, the area of an exposed surface of the display module DM may be adjusted according to the movement of the second case CS2. A default mode and an extended mode of the display device DD may be implemented according to the movement of the second case CS2.

For example, the display module DM may be a flexible display module and may be supported by a support member disposed under the display module DM. Detailed description of the support member will be provided below. The support member may be connected to the second case CS2, and in case that the second case CS2 moves away from the first case CS1 in the first direction DR1, the support member may also move away from the first case CS1 in the first direction DR1.

For example, a portion of the display module DM not exposed to the outside in addition to a portion of the display module DM exposed through the opening OP may be disposed in the first case CS1. The display module DM disposed on the support member may move together with the support member in the first direction DR1 according to the movement of the second case CS2, and thus the exposed surface of the display module DM may be extended.

As the exposed surface of the display module DM is extended, a user may visually recognize an image through a wider screen. The state of the display device DD in which the exposed surface of the display module DM is extended may be defined as the extended mode.

The exposed surface of the display module DM may be set to a minimum in the state in which the first case CS1 and the second case CS2 are coupled adjacent to each other as illustrated in FIG. 1. For example, as illustrated in FIG. 1, the first case CS1 and the second case CS2 may be disposed adjacent to each other by the movement of the second case CS2 toward the first case CS1 in the first direction DR1. The state of the display device DD of FIG. 1 may be defined as a first mode (e.g., default mode or non-extended mode). The state of the display device DD of FIG. 2 may be defined as as second mode (e.g., extended mode).

Figure 3:
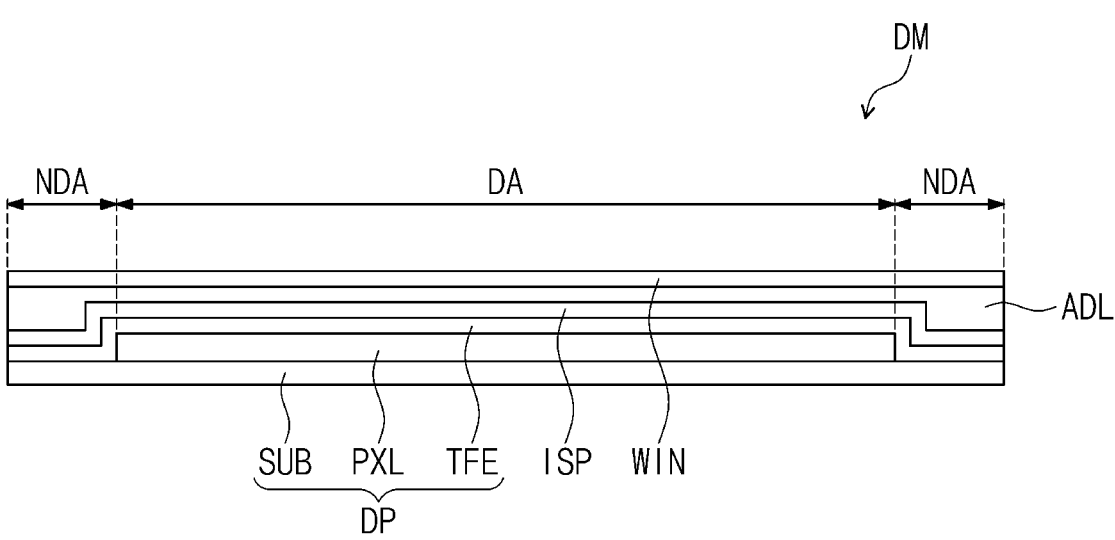
FIG. 3 is a schematic view illustrating a section of a display module illustrated in FIG. 1.

FIG. 3 is a schematic view illustrating a section of the display module illustrated in FIG. 1.

Referring to FIG. 3, the display module DM may include a display panel DP, an input sensing part ISP disposed on the display panel DP, a window WIN disposed on the input sensing part ISP, and an adhesive layer ADL.

The display panel DP according to an embodiment may be an emissive display panel. For example, the display panel DP may be an organic light emitting display panel or a quantum-dot light emitting display panel. An emissive layer of the organic light emitting display panel may include an organic light emitting material. An emissive layer of the quantum-dot light emitting display panel may include quantum dots and quantum rods. However, embodiments are not limited thereto, and various display panels, such as a liquid crystal display panel, an electro wetting display panel, and an electrophoresis display panel, which are capable of displaying an image may be used as the display panel DP. Hereinafter, it will be described in case that the display panel DP is an organic light emitting display panel.

The display panel DP may be a flexible display panel.

The display panel DP may include a substrate SUB, a pixel layer PXL disposed on the substrate SUB, and a thin film encapsulation layer TFE disposed on the substrate SUB to cover the pixel layer PXL. The substrate SUB may be a transparent substrate and may include a flexible plastic substrate. For example, the substrate SUB may include polyimide.

The substrate SUB may include a display region DA and a non-display region NDA around the display region DA. The pixel layer PXL may be disposed on the display region DA. The pixel layer PXL may include pixels, and each of the pixels may include a light emitting element. For example, the display region DA may be a region of the pixel layer PXL where light generated from the light emitting elements is displayed.

The thin film encapsulation layer TFE may include an inorganic layer and an organic layer. For example, the thin film encapsulation layer TFE may include an inorganic layer, an organic layer, and an in organic layer that are sequentially stacked with each other. The inorganic layers may include an inorganic material and may protect the pixel layer PXL from moisture/oxygen. The organic layer may include an organic material and may protect the pixel layer PXL from foreign matter such as dust particles. This is an example, and the thin film encapsulation layer TFE may be omitted or replaced with an encapsulation substrate and is not limited to any one embodiment.

The input sensing part ISP may be disposed on the thin film encapsulation layer TFE. The input sensing part ISP may sense an external input (e.g., the user's finger or a touch pen) and may change the sensed external input to an input signal. The input sensing part ISP may include sensing electrodes for sensing the external input. The sensing electrodes may sense the external input in a capacitive manner.

The input sensing part ISP may be manufactured (e.g., directly manufactured) on the thin film encapsulation layer TFE in manufacture of the display module DM. However, embodiments are not limited thereto. For example, the input sensing part ISP may be manufactured as a touch panel separate from the display panel DP and may be attached to the display panel DP by an adhesive.

The window WIN may protect the display panel DP and the input sensing part ISP from external scratches and impacts. The window WIN may be attached to the input sensing part ISP by the adhesive layer ADL. The adhesive layer ADL may include an optical clear adhesive, an optical clear resin, and a pressure sensitive adhesive. However, embodiments are not limited thereto. For example, the adhesive layer ADL may include various examples as long as the flexibility of the display module DM or the transparency provided by the window WIN is not excessively reduced in cast that the window WIN and the display panel DP are coupled. An image generated from the display panel DP may be provided to the user through the window WIN. This is an example. In the display module DM according to an embodiment, at least one of the input sensing part ISP, the adhesive layer ADL, and the window WIN may be omitted, and embodiments are not limited thereto.

Figure 4:
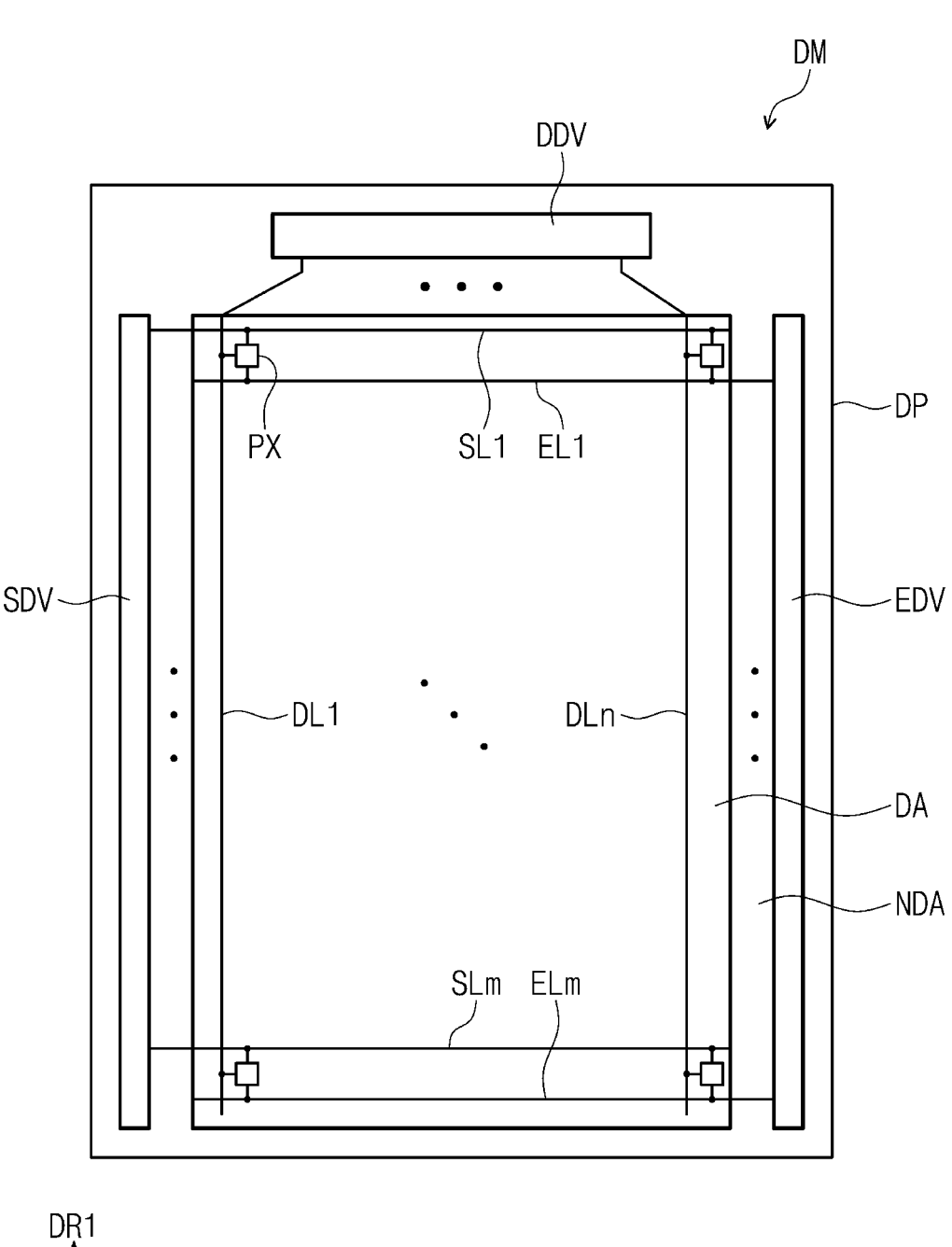
FIG. 4 is a schematic plan view of the display module illustrated in FIG. 3.

FIG. 4 is a schematic plan view of the display module illustrated in FIG. 3.

Referring to FIG. 4, the display module DM may include the display panel DP, a scan driver SDV, a data driver DDV, and an emission driver EDV. A planar configuration of the display panel DP is illustrated in FIG. 4, and a planar configuration of the input sensing part ISP is omitted.

The display panel DP may have a rectangular shape with long sides extending in the first direction DR1 and short sides extending in the second direction DR2. The display panel DP may have a plane defined by the first and second directions DR1 and DR2. The display panel DP may include a display region DA and a non-display region NDA surrounding the display region DA.

The display panel DP may include pixels PX, scan lines SL1 to SLm, data lines DL1 to DLn, and emission lines EL1 to ELm. Here, "m" and "n" are natural numbers. The pixels PX may be disposed in the display region DA and may be connected to the scan lines SL1 to SLm, the data lines DL1 to DLn, and the emission lines EL1 to ELm.

In this embodiment, the scan driver SDV, the data driver DDV, and the emission driver EDV may be disposed on the display panel DP. For example, the scan driver SDV, the data driver DDV, and the emission driver EDV may be disposed on the non-display region NDA. The scan driver SDV, the data driver DDV, and the emission driver EDV may be formed (e.g., directly formed) together with the pixels PX on the display panel DP, or may be mounted on the display panel DP in the form of a separate chip. This is an example. At least one of the scan driver SDV, the data driver DDV, and the emission driver EDV may be mounted on a separate circuit board and may be connected to the display panel DP, and embodiments are not limited thereto.

The emission driver EDV may be disposed on the non-display region NDA adjacent to an opposite side of the display panel DP that is opposite to a side of the display panel DP. The data driver DDV may be manufactured in the form of an integrated circuit chip and may be disposed on the non-display region NDA adjacent to one of the short sides of the display panel DP.

The scan lines SL1 to SLm may extend in the second direction DR2 and may be connected to the scan driver SDV. The data lines DL1 to DLn may extend in the first direction DR1 and may be connected to the data driver DDV. The emission lines EL1 to ELm may extend in the second direction DR2 and may be connected to the emission driver EDV.

The scan driver SDV may generate scan signals, and the scan signals may be applied to the pixels PX through the scan lines SL1 to SLm. The scan signals may be sequentially applied to the pixels PX. The data driver DDV may generate data voltages, and the data voltages may be applied to the pixels PX through the data lines DL1 to DLn. The emission driver EDV may generate emission signals, and the emission signals may be applied to the pixels PX through the emission lines EL1 to ELm.

Operations of the scan driver SDV, the data driver DDV, and the emission driver EDV may be controlled by a non-illustrated timing controller. The timing controller may generate a scan control signal, a data control signal, and an emission control signal in response to control signals received from the outside. The timing controller may receive image signals from the outside, may convert the data format of the image signals according to the specification (or standard) of an interface with the data driver DDV, and may provide the converted signals to the data driver DDV.

The scan driver SDV may generate the scan signals in response to the scan control signal, and the emission driver EDV may generate the emission signals in response to the emission control signal. The data driver DDV may receive the image signals having the converted data format and may generate the data voltages corresponding to the image signals in response to the data control signal.

The pixels PX may receive the data voltages in response to the scan signals. The pixels PX may display an image by emitting light having luminance corresponding to the data voltages in response to the emission signals.

Figure 5:
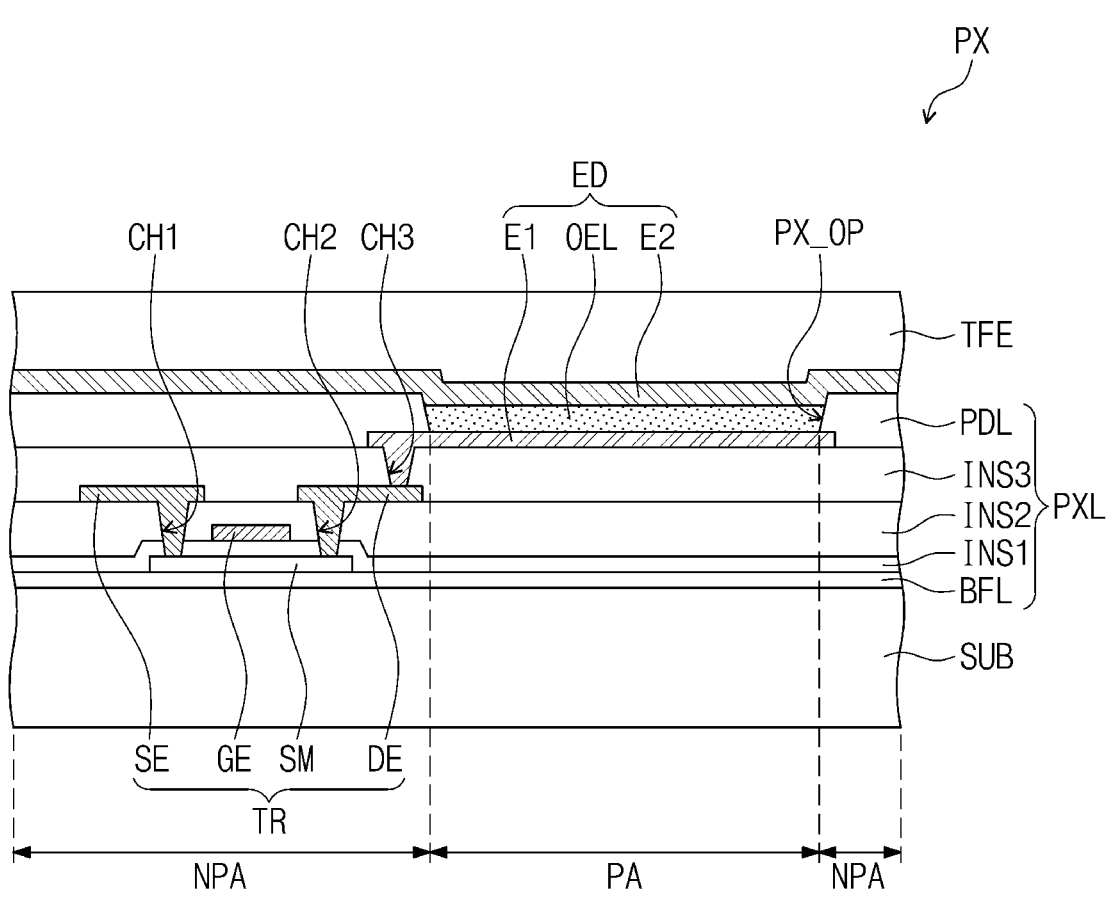
FIG. 5 is a schematic view illustrating a sectional structure of a representative pixel illustrated in FIG. 4.

FIG. 5 is a schematic view illustrating a sectional structure of a representative pixel illustrated in FIG. 4.

Referring to FIG. 5, the pixel PX may include a light emitting element ED and a transistor TR connected to the light emitting element ED. The light emitting element ED may include a first electrode E1, a second electrode E2, and an organic emissive layer OEL disposed between the first electrode E1 and the second electrode E2. The first electrode E1 may be an anode, and the second electrode E2 may be a cathode.

The pixel PX may be divided into a pixel region PA and a non-pixel region NPA around the pixel region PA. The pixel region PA may be a region where light is displayed, and at least one pixel region PA may be provided for each pixel PX. The non-pixel region NPA may be a region where light is not displayed and may be a region between the pixel regions.

The transistor TR and the light emitting element ED may be disposed on the substrate SUB. A buffer layer BFL may be disposed on the substrate SUB. The buffer layer BFL may include an inorganic material. A semiconductor layer SM of the transistor TR may be disposed on the buffer layer BFL. The semiconductor layer SM may include a semiconductor made of an inorganic material, such as amorphous silicon or polycrystalline silicon, or an organic semiconductor. In another example, the semiconductor layer SM may include an oxide semiconductor. For ease of description, one transistor TR is illustrated in FIG. 5. However, embodiments are not limited thereto. For example, the pixel PX may include transistors electrically connected together and is not limited to any one embodiment.

For example, the semiconductor layer SM may include a source region, a drain region, and a channel region between the source region and the drain region. The channel region may be defined in a position overlapping a gate electrode GE on a plane in the semiconductor layer SM. The source region and the drain region may be regions having a higher electrical conductivity than the channel region.

A first insulating layer INS1 may be disposed on the buffer layer BFL to cover the semiconductor layer SM. The first insulating layer INS1 may be a gate insulating layer. The first insulating layer INS1 may include an inorganic material. The gate electrode GE of the transistor TR that overlaps the semiconductor layer SM may be disposed on the first insulating layer INS1. The gate electrode GE may overlap the channel region of the semiconductor layer SM.

For example, the semiconductor layer SM according to an embodiment may be disposed on the gate electrode GE. For example, the gate electrode GE, the first insulating layer INS1, and the semiconductor layer SM may be sequentially stacked with each other.

A second insulating layer INS2 may be disposed on the first insulating layer INS1 to cover the gate electrode GE. The second insulating layer INS2 may be defined as an interlayer insulating layer. The second insulating layer INS2 may include an organic material and/or an inorganic material.

A source electrode SE and a drain electrode DE of the transistor TR may be disposed on the second insulating layer INS2 so as to be spaced apart from each other. The source electrode SE may be connected to the source region of the semiconductor layer SM through a first contact hole CH1 formed to penetrate (or passing through) the first insulating layer INS1 and the second insulating layer INS2. The drain electrode DE may be connected to the drain region of the semiconductor layer SM through a second contact hole CH2 formed to penetrate (or passing through) the first insulating layer INS1 and the second insulating layer INS2.

For example, at least one of the source electrode SE and the drain electrode DE may be connected (e.g., directly connected) to the semiconductor layer SM. For example, at least one of the source electrode SE and the drain electrode DE may be formed on the same layer (e.g., the semiconductor layer SM), but may cover an upper surface of the source region or the drain region. For example, at least one of the source electrode SE and the drain electrode DE may be connected to the semiconductor layer SM without a separate contact hole.

In another example, at least one of the source electrode SE and the drain electrode DE of the transistor TR may be omitted. For example, the source region and the drain region may function as the source electrode SE and the drain electrode DE, respectively. For example, at least one of the source electrode SE and the drain electrode DE may be integral with the semiconductor layer SM. The transistor TR according to an embodiment may be formed in various structures and is not limited to any one embodiment.

A third insulating layer INS3 may be disposed on the second insulating layer INS2 to cover the source electrode SE and the drain electrode DE of the transistor TR. The third insulating layer INS3 may be defined as a planarization layer that provides a flat upper surface and may include an organic material.

The first electrode E1 may be disposed on the third insulating layer INS3. The first electrode E1 may be connected to the drain electrode DE of the transistor TR through a third contact hole CH3 formed to penetrate the third insulating layer INS3. The first electrode E1 may be defined as a pixel electrode.

A pixel defining layer PDL may be disposed on the first electrode E1 and the third insulating layer INS3. An opening PX_OP exposing at least a portion of the first electrode E1 may be formed in the pixel defining layer PDL. The pixel region PA may be substantially defined by the opening PX_OP.

The second electrode E2 may be disposed on the first electrode E1. The second electrode E2 may overlap the pixel defining layer PDL and the opening PX_OP and may be integrally formed on the front surface of the display panel. However, this is an example, and the second electrode E2 may be patterned and provided for each pixel PX and is not limited to any one embodiment.

The organic emissive layer OEL may be disposed between the first electrode E1 and the second electrode E2. The organic emissive layer OEL may overlap the opening PX_OP. The organic emissive layer OEL may generate light in response to a difference in voltage between the first electrode E1 and the second electrode E2. The organic emissive layer OEL may include an organic light emitting material, an inorganic light emitting material, or a mixture thereof. The organic emissive layer OEL may include a single emissive layer or may include a plurality of emissive layers. The organic emissive layer OEL may emit red light, green light, blue light, or white light. However, embodiments are not limited thereto. For example, the organic emissive layer OEL may emit light having various colors according to a light emitting material of the organic emissive layer OEL and is not limited to any one embodiment.

For example, at least one organic layer may be additionally disposed between the first electrode E1 and the organic emissive layer OEL or between the second electrode E2 and the organic emissive layer OEL. The organic layer may include an electron transport layer, an electron injection layer, a hole transport layer, a hole injection layer, an electron blocking layer, a hole blocking layer, a charge generation layer, or a combination thereof and is not limited to any one embodiment.

The thin film encapsulation layer TFE may be disposed on the light emitting element ED to cover the pixel PX. The layers between the substrate SUB and the thin film encapsulation layer TFE may be defined as the pixel layer PXL.

Figure 6:
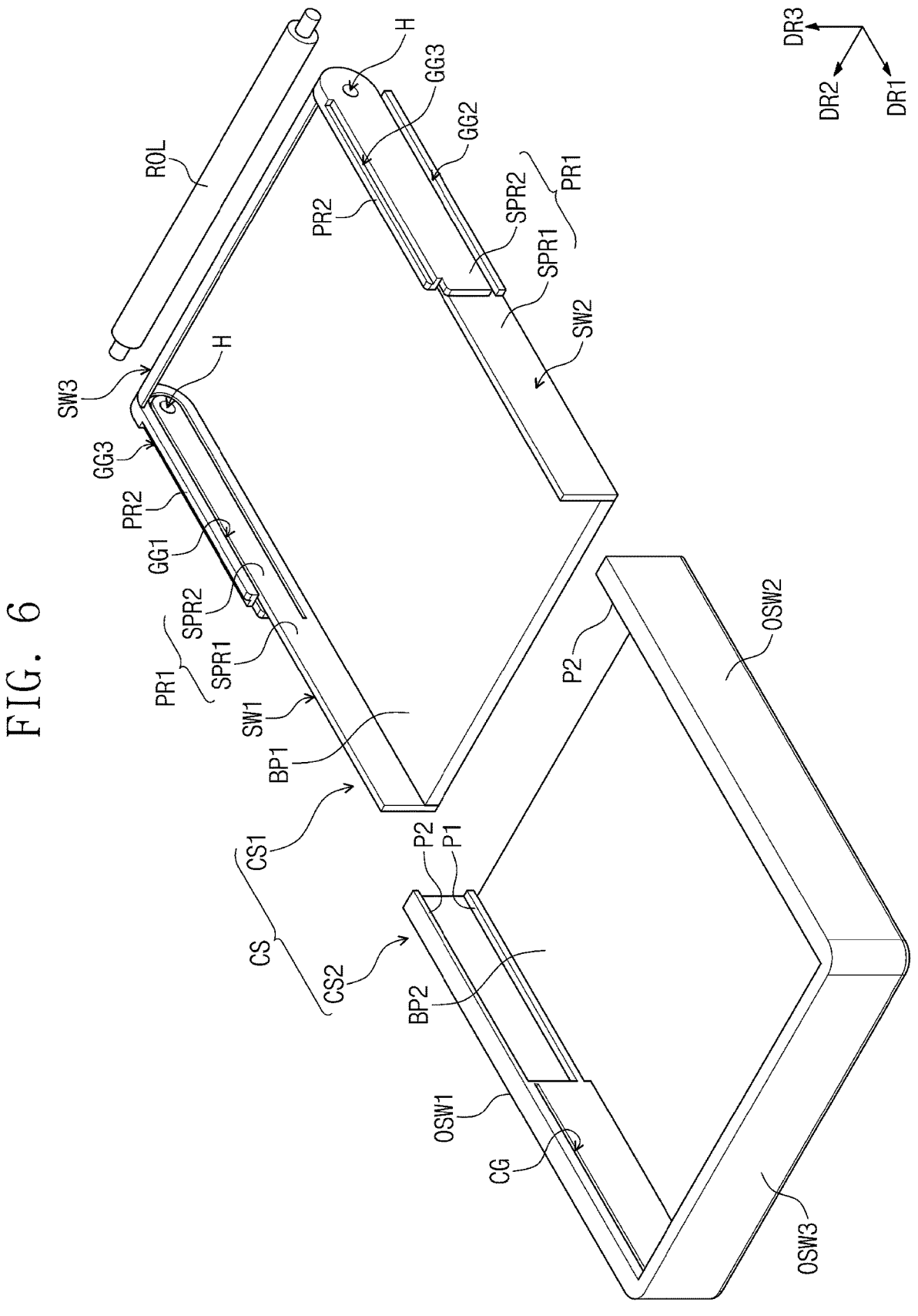
FIG. 6 is a schematic exploded perspective view of a case illustrated in FIG. 1.
Figure 7:
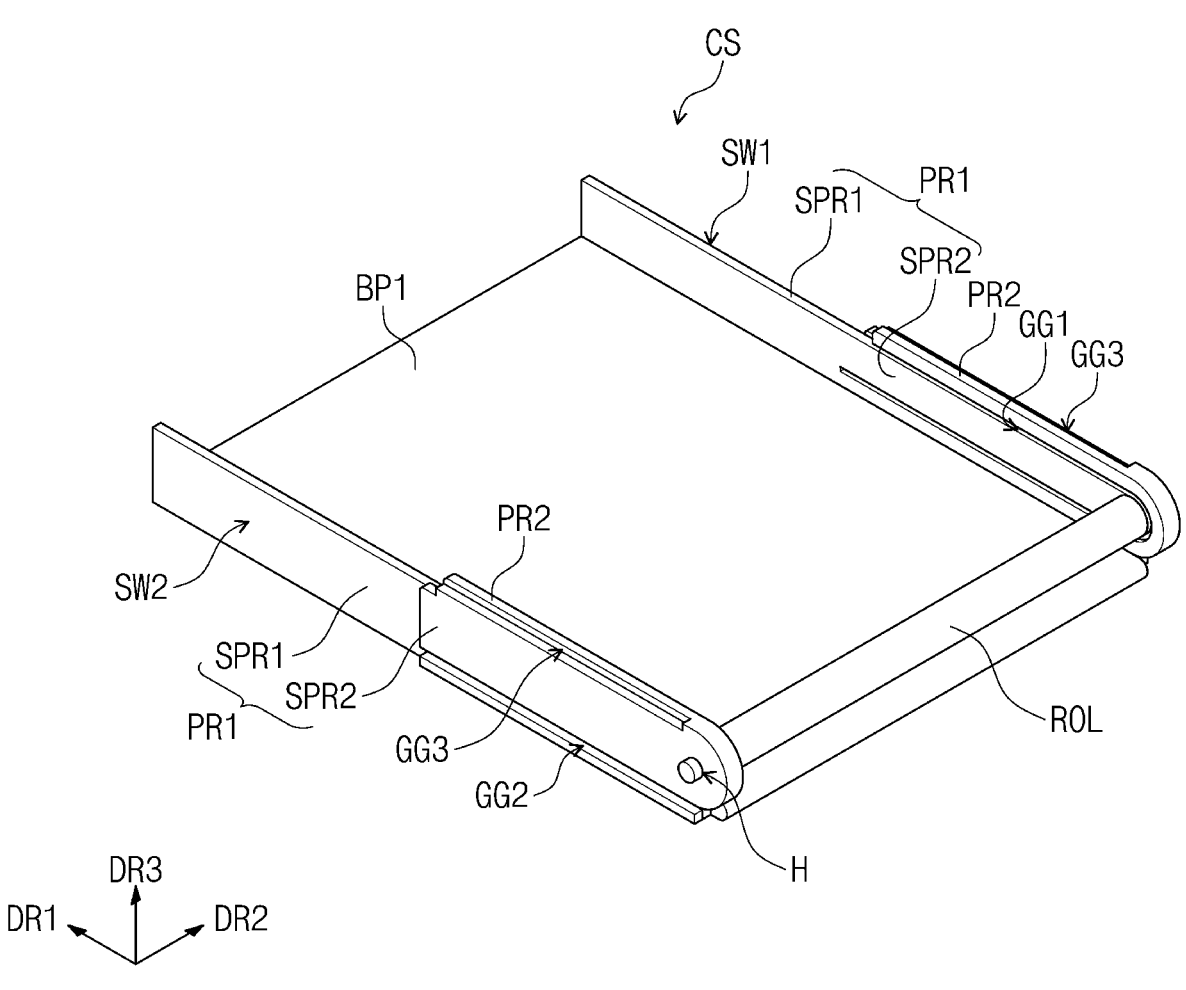
FIG. 7 is a schematic view illustrating a roller disposed in a first case illustrated in FIG. 6.

FIG. 6 is a schematic exploded perspective view of the case illustrated in FIG. 1. FIG. 7 is a schematic view illustrating a roller disposed in the first case illustrated in FIG. 6.

In FIG. 7, a third sidewall SW3 is omitted to describe the roller ROL.

Referring to FIG. 6, the case CS may include the first case CS1, the second case CS2, and the roller ROL. The roller ROL may be disposed in the first case CS1, and detailed description of the roller ROL will be provided below with reference to FIG. 7. Furthermore, a support member SP (refer to FIG. 13 to be described below) may also be disposed in the first case CS1, and this configuration will be described below with reference to FIG. 13.

The first case CS1 may include a first sidewall SW1, a second sidewall SW2, the third sidewall SW3, and a first bottom part BP1. The first sidewall SW1 may have a plane defined by the first and third directions DR1 and DR3 and may extend longer in the first direction DR1 than in the third direction DR3.

The second sidewall SW2 may have a plane defined by the first and third directions DR1 and DR3 and may extend longer in the first direction DR1 than in the third direction DR3. The second sidewall SW2 may face the first sidewall SW1 in the second direction DR2.

The first sidewall SW1 and the second sidewall SW2 may have substantially the same shape. A side of the first sidewall SW1 and a side of the second sidewall SW2 may have an outwardly convex curved shape.

A first guide groove GG1 may be formed on each of an inside surface of the first sidewall SW1 and an inside surface of the second sidewall SW2 that face each other. The inside surfaces of the first and second sidewalls SW1 and SW2 may define inside surfaces of the first case CS1 that face each other in the second direction DR2.

Although the first guide groove GG1 formed on the inside surface of the first sidewall SW1 is illustrated in FIG. 6, the first guide groove GG1 may also be formed on the inside surface of the second sidewall SW2. The first guide groove GG1 may have a shape in which a "U" shape is rotated by about 90 degrees in the counterclockwise direction. The specific shape of the first guide groove GG1 will be described below in detail.

Hereinafter, a surface of the first sidewall SW1 that is opposite to the inside surface of the first sidewall SW1 is defined as an outside surface of the first sidewall SW1. A surface of the second sidewall SW2 that is opposite to the inside surface of the second sidewall SW2 is defined as an outside surface of the second sidewall SW2. Furthermore, inside surfaces and outside surfaces of sub-components of the first and second sidewalls SW1 and SW2 to be described below may correspond to the inside surfaces and the outside surfaces of the first and second sidewalls SW1 and SW2.

A second guide groove GG2 extending in the first direction DR1 may be formed on the outside surface of each of the first and second sidewalls SW1 and SW2. A third guide groove GG3 extending in the first direction DR1 may be formed at an upper end portion of each of the first and second sidewalls SW1 and SW2. Although the second guide groove GG2 and the third guide groove GG3 formed on the second sidewall SW2 are illustrated, the second guide groove GG2 and the third guide groove GG3 may also be formed on the first sidewall SW1.

Each of the first and second sidewalls SW1 and SW2 may include a first frame PR1 and a second frame PR2 that is disposed on a certain frame of the first frame PR1 adjacent to a side of the first frame PR1 and that extends in the first direction DR1. The side of the first frame PR1 may correspond to the side of the first sidewall SW1 and the side of the second sidewall SW2. A portion of the first guide groove GG1 may be disposed between the first frame PR1 and the second frame PR2.

The first frame PR1 may include a first sub-frame SPR1 not overlapping the second frame PR2 when viewed in the third direction DR3 and a second sub-frame SPR2 overlapping the second frame PR2 when viewed in the third direction DR3. The second sub-frame SPR2 may be disposed under the second frame PR2.

An inside surface of the first sub-frame SPR1 and an inside surface of the second sub-frame SPR2 may be disposed on the same plane. An outside surface of the second sub-frame SPR2 may be disposed farther away from the center of the first case CS1 than an outside surface of the first sub-frame SPR1. For example, based on the second direction DR2, the thickness of the second sub-frame SPR2 may be greater than the thickness of the first sub-frame SPR1.

The second guide groove GG2 may be formed on the outside surface of the second sub-frame SPR2. The second guide groove GG2 may be adjacent to a lower end portion of the second sub-frame SPR2. The third guide groove GG3 may be formed at an upper end portion of the second frame PR2. The third guide groove GG3 may be formed at the upper end portion of the second frame PR2 that is adjacent to an outside surface of the second frame PR2.

The third sidewall SW3 may be disposed between the side of the first sidewall SW1 and the side of the second sidewall SW2. The third sidewall SW3 may define a side of the first case CS1 of opposite sides of the first case CS1 opposite to each other in the first direction DR1. The second frame PR2 and the second sub-frame SPR2 may be adjacent to the third sidewall SW3.

The first bottom part BP1 may have a plane defined by the first and second directions DR1 and DR2. The first bottom part BP1 may be connected to lower end portions of the first, second, and third sidewalls SW1, SW2, and SW3.

The second case CS2 may include a first outside wall OSW1, a second outside wall OSW2, a third outside wall OSW3, and a second bottom part BP2. The first outside wall OSW1 may have a plane defined by the first and third directions DR1 and DR3 and may have a shape extending longer in the first direction DR1 than in the third direction DR3.

The second outside wall OSW2 may have a plane defined by the first and third directions DR1 and DR3 and may extend longer in the first direction DR1 than in the third direction DR3. The second outside wall OSW2 may face the first outside wall OSW1 in the second direction DR2. The first outside wall OSW1 and the second outside wall OSW2 may have substantially the same shape.

The second case CS2 may include first protrusions P1. For example, the first protrusions P1 may protrude from each of an inside surface of the first outside wall OSW1 and an inside surface of the second outside wall OSW2 facing each other and may extend in the first direction DR1. The first protrusions P1 may extend in the first direction DR1 from each of a side of the first outside wall OSW1 and a side of the second outside wall OSW2.

Although the first protrusions P1 disposed on the inside surface of the first outside wall OSW1 is illustrated in FIG. 6, the first protrusions P1 may also be disposed on the inside surface of the second outside wall OSW2. The first protrusions P1 may be adjacent to a lower end portion of each of the first and second outside walls OSW1 and OSW2. Substantially, the first protrusions P1 may be disposed to correspond to the position in which the second guide groove GG2 is disposed.

The side of the first outside wall OSW1 and the side of the second outside wall OSW2 may be defined as end portions of the first and second outside walls OSW1 and OSW2 that are adjacent to the side of the first sidewall SW1 and the side of the second sidewall SW2 in case that the first and second cases CS1 and CS2 are coupled to each other. Hereinafter, a side opposite to the side of the first outside wall OSW1 is defined as an opposite side of the first outside wall OSW1, and a side opposite to the side of the second outside wall OSW2 is defined as an opposite side of the second outside wall OSW2.

The second case CS2 may include second protrusions P2 that protrudes from each of an upper end portion of the first outside wall OSW1 and an upper end portion of the second outside wall OSW2 and extends in the first direction DR1. The second protrusions P2 may extend in the first direction DR1 from each of the side of the first outside wall OSW1 and the side of the second outside wall OSW2. The second protrusions P2 may be disposed to correspond to the position in which the third guide groove GG3 is disposed.

A connecting groove CG may be formed on each of the inside surface of the first outside wall OSW1 and the inside surface of the second outside wall OSW2. The connecting groove CG may be adjacent to the opposite side of each of the first and second outside walls OSW1 and OSW2. Although the connecting groove CG formed on the inside surface of the first outside wall OSW1 is illustrated in FIG. 6, the connecting groove CG may also be formed on the inside surface of the second outside wall OSW2. The inside surfaces of the first and second outside walls OSW1 and OSW2 may define inside surfaces of the second case CS2 that face each other in the second direction DR2.

The third outside wall OSW3 may face the third sidewall SW3 and may be disposed between the first outside wall OSW1 and the second outside wall OSW2. The third outside wall OSW3 may be disposed between the opposite side of the first outside wall OSW1 and the opposite side of the second outside wall OSW2.

The second bottom part BP2 may have a plane defined by the first and second directions DR1 and DR2. The second bottom part BP2 may be connected to the lower end portions of the first, second, and third outside walls OSW1, OSW2, and OSW3.

The roller ROL may extend in the second direction DR2. The roller ROL may have a cylindrical shape extending in the second direction DR2. The roller ROL may rotate about the central axis of the roller ROL that extends in the second direction DR2.

Referring to FIGS. 6 and 7, the roller ROL may be disposed in the first case CS1. The roller ROL may be disposed between the first sidewall SW1 and the second sidewall SW2. The roller ROL may be adjacent to the side of the first sidewall SW1 and the side of the second sidewall SW2 (or the third sidewall SW3).

The roller ROL may be connected to the first case CS1. For example, opposite end portions of the roller ROL opposite to each other in the second direction DR2 may be inserted into holes H formed in frames of the first and second sidewalls SW1 and SW2 that are adjacent to the side of the first sidewall SW1 and the side of the second sidewall SW2.

Figure 8:
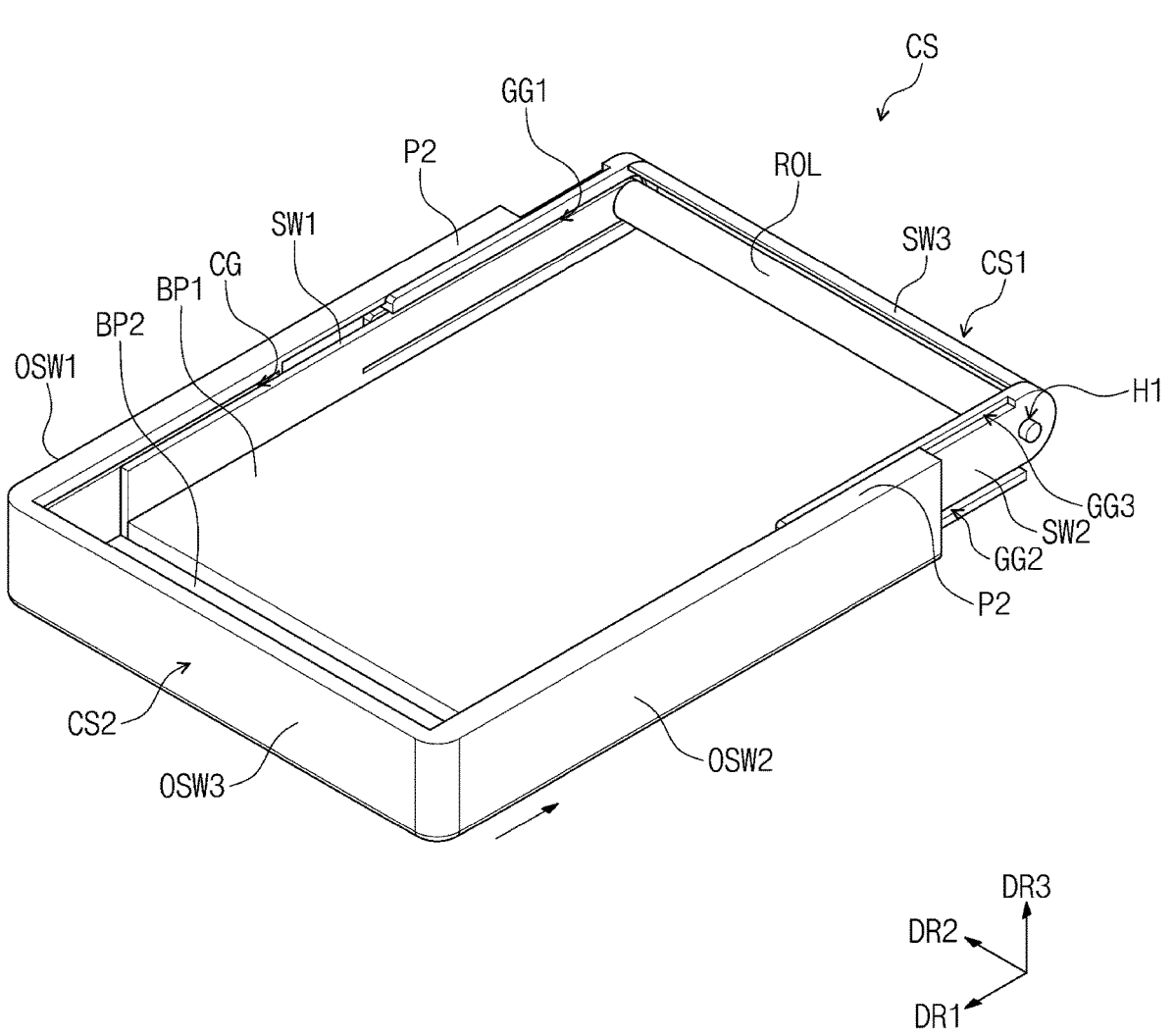
FIGS. 8 and 9 are schematic views illustrating a state in which a second case illustrated in FIG. 6 is coupled to the first case.
Figure 9:
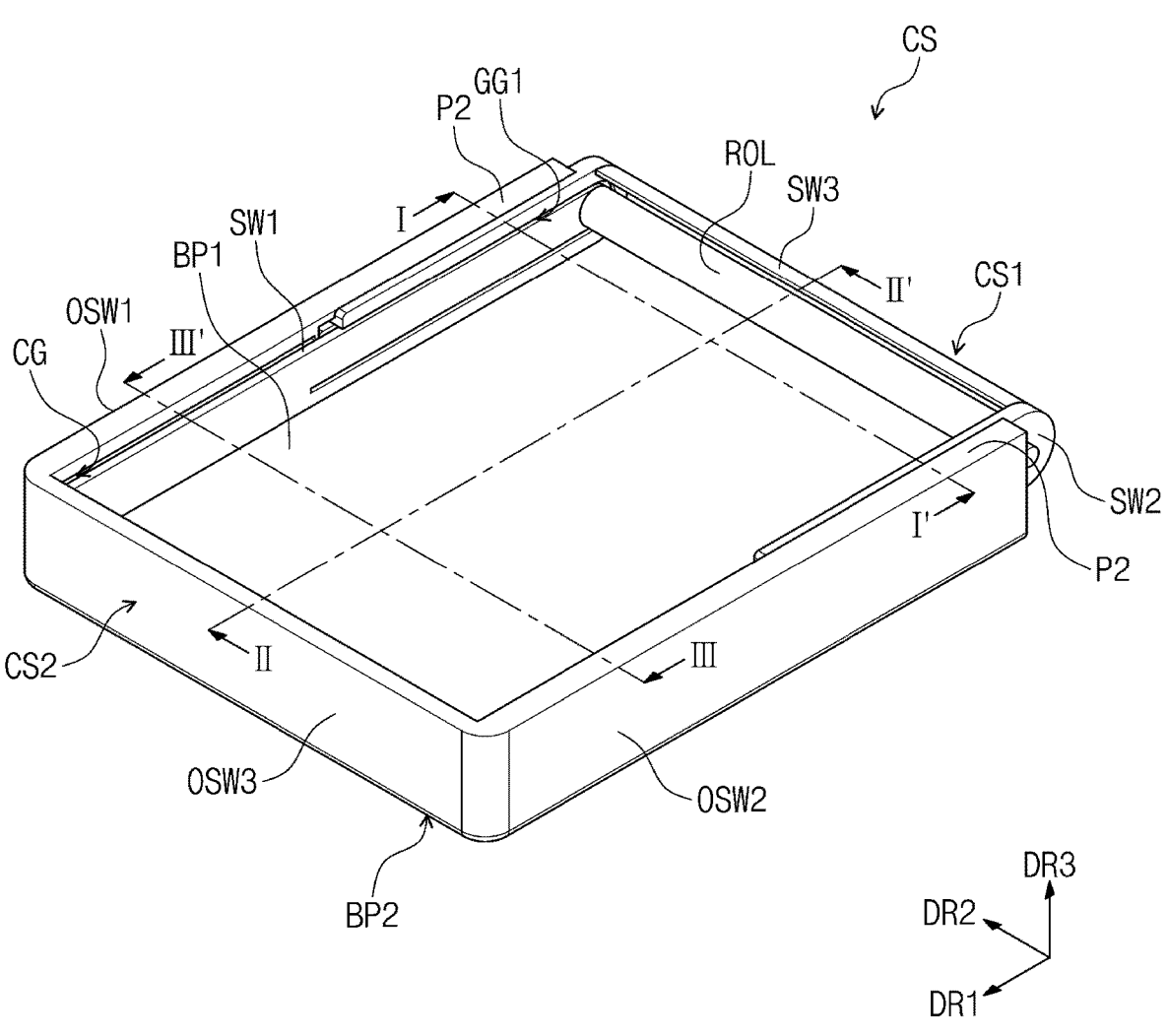

FIGS. 8 and 9 are schematic views illustrating a state in which the second case illustrated in FIG. 6 is coupled to the first case.

Referring to FIGS. 8 and 9, the second case CS2 may be coupled to the first case CS1 by being inserted into the second and third guide grooves GG2 and GG3. For example, the second case CS2 may be coupled to the first case CS1 by insertion of the first protrusions P1 into the second guide grooves GG2 and insertion of the second protrusions P2 into the third guide grooves GG3. This configuration will be described below in detail with reference to FIG. 10.

The first outside wall OSW1 may be disposed on the outside surface of the first sidewall SW1, and the second outside wall OSW2 may be disposed on the outside surface of the second sidewall SW2. The first bottom part BP1 may be disposed under the second bottom part BP2.

In case that the second case CS2 is coupled to the first case CS1, the side of the first outside wall OSW1 and the side of the second outside wall OSW2 may be adjacent to the side of the first sidewall SW1 and the side of the second sidewall SW2, and the opposite side of the first outside wall OSW1 and the opposite side of the second outside wall OSW2 may be adjacent to the opposite side of the first sidewall SW1 and the opposite side of the second sidewall SW2. The third outside wall OSW3 may be adjacent to the opposite side of the first sidewall SW1 and the opposite side of the second sidewall SW2.

The side of the second case CS2 may be adjacent to the side of the first case CS1, and the opposite side of the second case CS2 that is opposite to the side of the second case CS2 may be adjacent to the opposite side of the first case CS1. The opposite side of the second case CS2 may be defined by the third outside wall OSW3.

Figure 10:
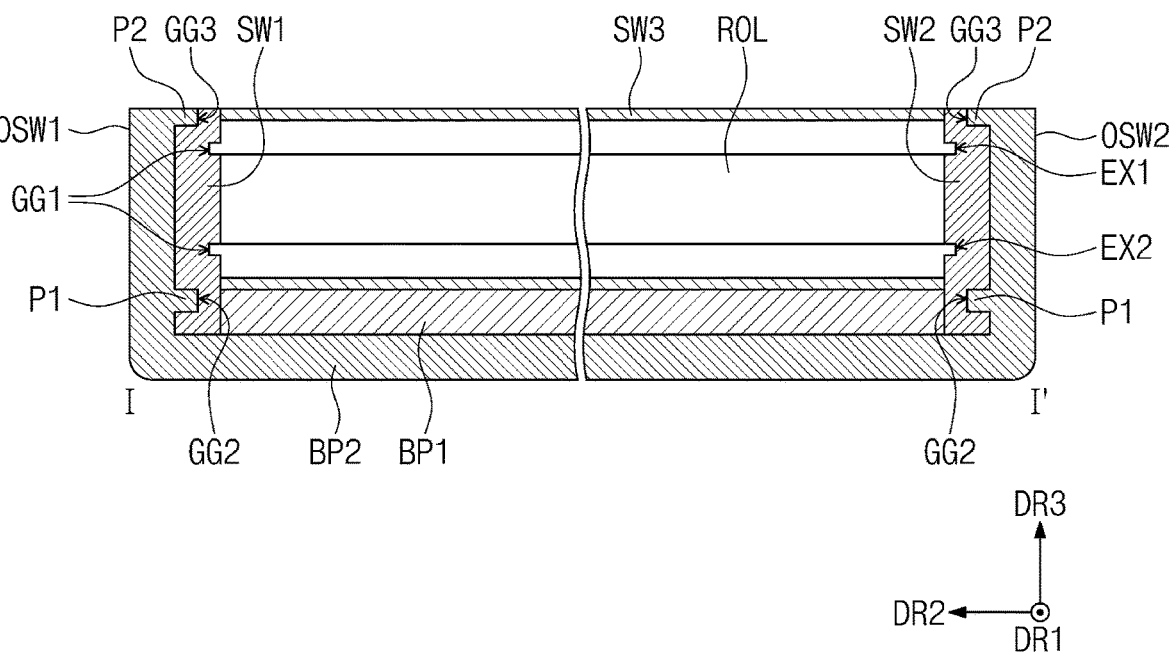
FIG. 10 is a schematic sectional view taken along line I-I' illustrated in FIG. 9.
Figure 11:
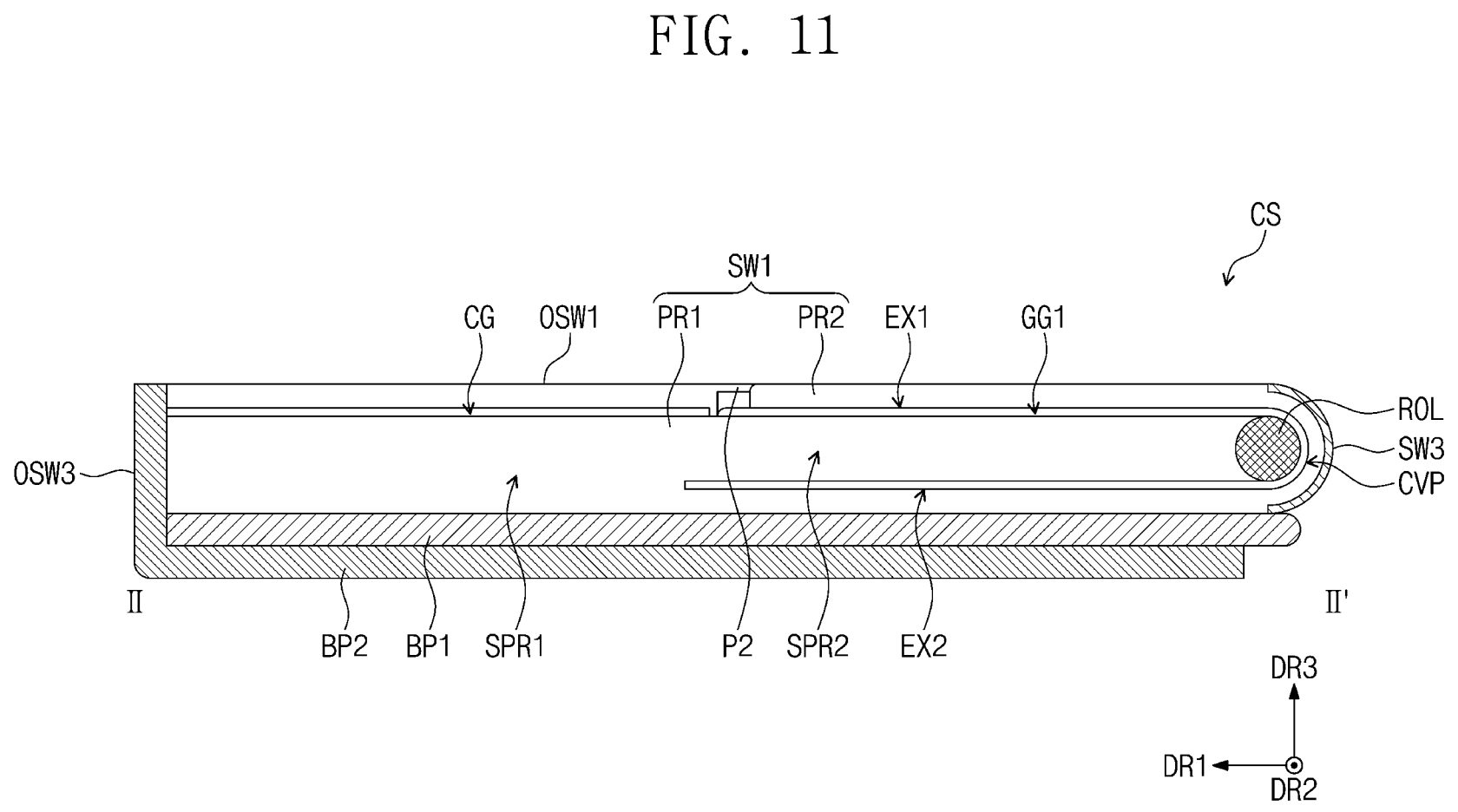
Figure 12:
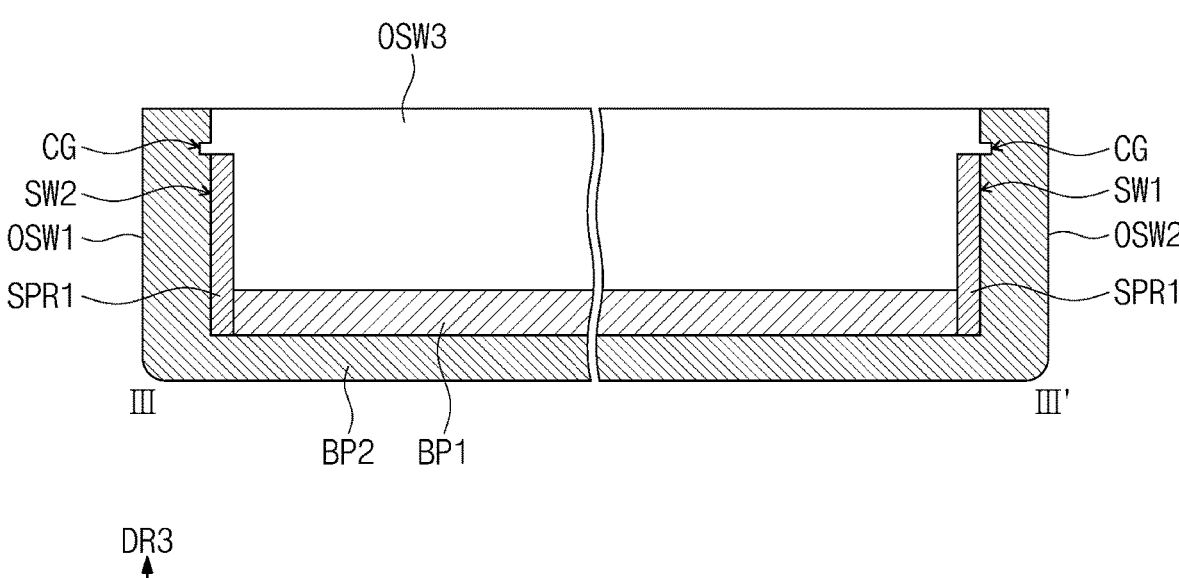
FIG. 12 is a schematic sectional view taken along line III-III' illustrated in FIG. 9.

FIG. 10 is a schematic sectional view taken along line I-I' illustrated in FIG. 9. FIG. 11 is a sectional view taken along line II-II' illustrated in FIG. 9. FIG. 12 is a schematic sectional view taken along line III-III' illustrated in FIG. 9.

Referring to FIG. 10, the inside surface of the first outside wall OSW1 may be a surface of the first outside wall OSW1 that faces the outside surface of the first sidewall SW1. The inside surface of the second outside wall OSW2 may be a surface of the second outside wall OSW2 that faces the outside surface of the second sidewall SW2.

The first protrusions P1 may protrude from the inside surfaces of the first and second outside walls OSW1 and OSW2 toward the first and second sidewalls SW1 and SW2. The first protrusions P1 may be adjacent to the lower end portions of the first and second outside walls OSW1 and OSW2. The first protrusions P1 may be inserted into the second guide grooves GG2.

The second protrusions P2 may protrude from the upper end portions of the first and second outside walls OSW1 and OSW2 toward the first and second sidewalls SW1 and SW2. The second protrusions P2 may be inserted into the third guide grooves GG3.

Referring to FIG. 11, the third sidewall SW3 may have a curved shape that is convex toward the outside. An inside surface of the third sidewall SW3 that faces the third outside wall OSW3 may have a concave curved shape. An outside surface of the third sidewall SW3 that is opposite to the inside surface of the third sidewall SW3 may have a curved shape that is convex toward the outside.

The first guide groove GG1 may be closer to the side of the first sidewall SW1 (or the second sidewall SW2) than to the opposite side of the first sidewall SW1 (or the second sidewall SW2). The first guide groove GG1 may include a first extension groove portion EX1, a second extension groove portion EX2, and a curved groove portion CVP. The first extension groove portion EX1 may extend in the first direction DR1. The second extension groove portion EX2 may extend in the first direction DR1 and may be disposed under the first extension groove portion EX1.

Although the second extension groove portion EX2 is illustrated as being longer than the first extension groove portion EX1 in the first direction DR1, a relationship between the length of the second extension groove portion EX2 and the length of the first extension groove portion EX1 is not limited thereto.

The curved groove portion CVP may extend from a side of the first extension groove portion EX1 to a side of the second extension groove portion EX2 to have a curved shape. The side of the first extension groove portion EX1 and the side of the second extension groove portion EX2 may be adjacent to the side of the first case CS1 (or the third sidewall SW3). The curved groove portion CVP may have a curved shape that is convex toward the side of the first case CS1 (or the third sidewall SW3).

The roller ROL may be disposed between the first extension groove portion EX1 and the second extension groove portion EX2. The roller ROL may be adjacent to the curved groove portion CVP. A portion of an outer circumferential surface of the roller ROL may overlap an inner boundary of the curved groove portion CVP.

Referring to FIGS. 11 and 12, the heights of the upper end portions of the first and second outside walls OSW1 and OSW2 may be greater than the heights of the first sub-frames SPR1. The connecting grooves CG may be formed on the first and second outside walls OSW1 and OSW2. When viewed in the second direction DR2, each of the connecting grooves CG may be disposed on substantially the same line as the first extension groove portion EX1 without overlapping the first extension groove portion EX1.

The connecting grooves CG may be formed on the first and second outside walls OSW1 and OSW2 not overlapping the first extension groove portion EX1. For example, the connecting grooves CG may be formed on frames of the first and second outside walls OSW1 and OSW2 disposed above the first sub-frames SPR1. The connecting grooves CG may be adjacent to the opposite side of the second case CS2 (or the third outside wall OSW3).

Figure 13:
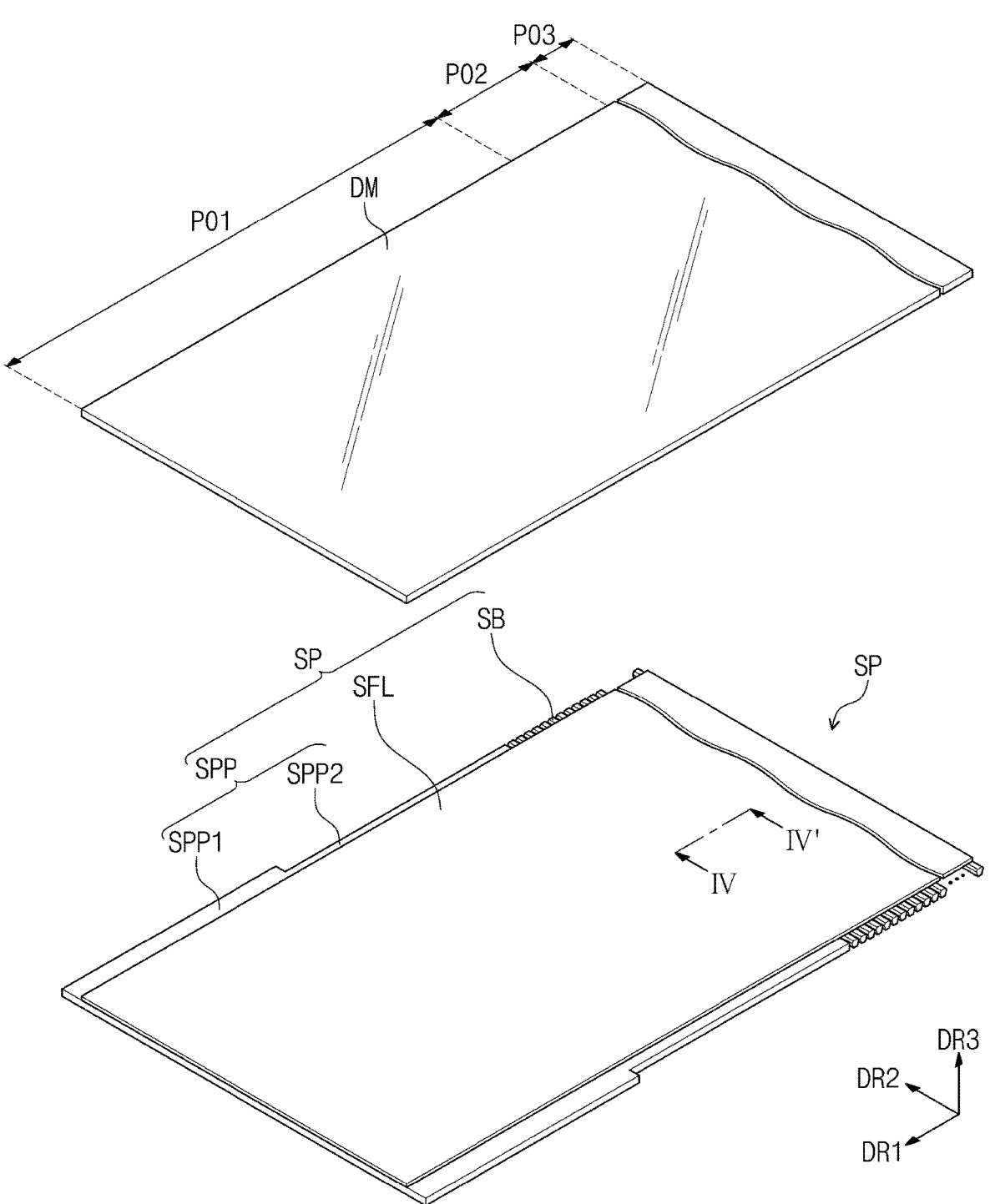
FIG. 13 is a schematic view illustrating the display module and a support member to be disposed in the first case illustrated in FIG. 6.
Figure 14A:
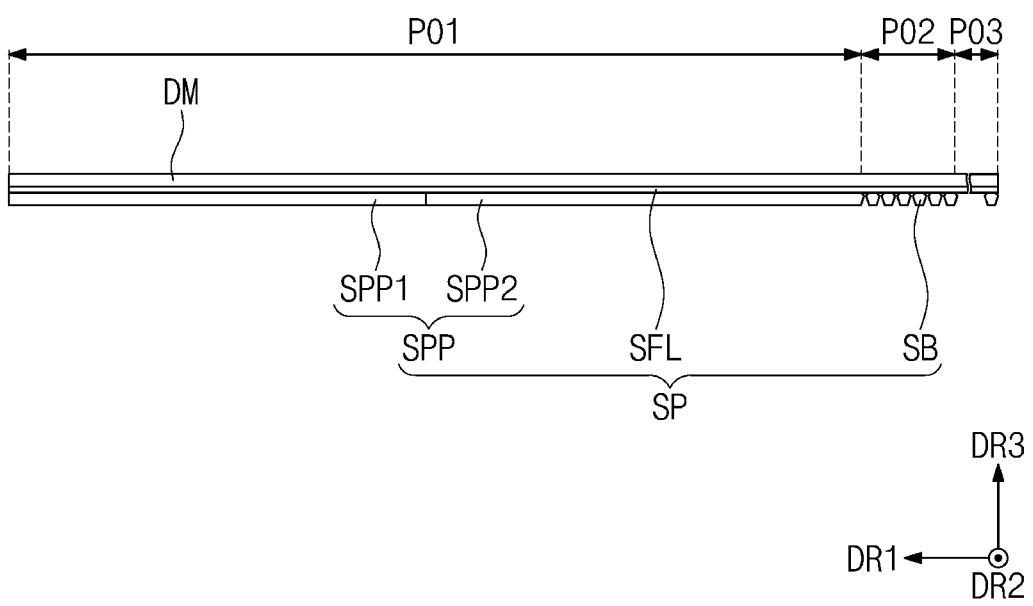
FIGS. 14A and 14B are schematic side views of the display module and the support member illustrated in FIG. 13 as viewed in a second direction.
Figure 14B:
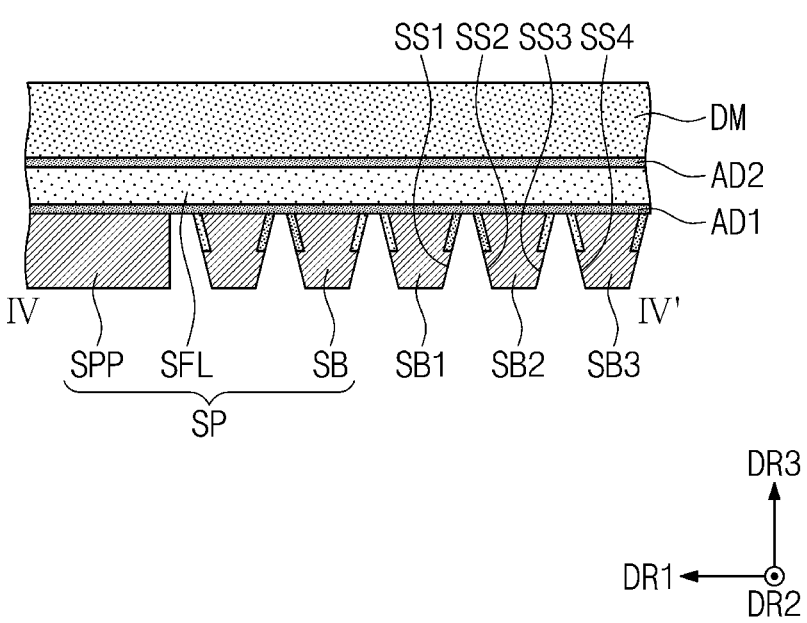

FIG. 13 is a schematic view illustrating the display module and the support member to be disposed in the first case illustrated in FIG. 6. FIGS. 14A and 14B are schematic side views of the display module and the support member illustrated in FIG. 13 as viewed in the second direction. FIGS. 15A to 15D are schematic sectional views taken along line IV-IV' illustrated in FIG. 13.

In FIG. 14, for convenience of description, the display module DM and the support member SP are illustrated in a coupled state.

Referring to FIGS. 13 and 14, the display device DD may include the support member SP that is disposed on the rear surface of the display module DM and that supports the display module DM. The support member SP may include a support plate SPP, support bars SB, and a support film SFL. The support plate SPP, the support bars SB, and the support film SFL may be disposed under the display module DM.

The display module DM may include a first portion P01, a second portion P02, and a third portion P03. The third portion P03 may be disposed between the first portion P01 and the second portion P02. The support plate SPP may be disposed on a rear surface of the first portion P01, and the support bars SB may be disposed on a rear surface of the second portion P02 and a rear surface of the third portion P03.

The shape of the display module DM may vary according to operating modes. For example, in the default mode (refer to FIG. 1), the third portion P03 may be disposed in a bent state with respect to the first direction DR1 or the second direction DR2, and in the extended mode (refer to FIG. 2), the third portion P03 may be unbent parallel to the first direction DR1.

The support plate SPP and the support bars SB may be arranged in the first direction DR1. The support plate SPP may have a plane defined by the first and second directions DR1 and DR2. The support plate SPP may include a first support plate SPP1 and a second support plate SPP2. The second support plate SPP2 may be disposed between the first support plate SPP1 and the support bars SB.

Based on the second direction DR2, the length of the first support plate SPP1 may be greater than the length of the second support plate SPP2 and the length of each of the support bars SB. Based on the second direction DR2, the length of the second support plate SPP2 may be substantially equal to the length of each of the support bars SB. The support bars SB may extend in the second direction DR2 and may be arranged in the first direction DR1. The support bars SB may be spaced apart from each other in the first direction DR1.

The support bars SB may extend in the second direction DR2 and may be arranged in the first direction DR1. The support bars SB may be spaced apart from each other in the first direction DR1. The support bars SB may have an inverted trapezoidal shape when viewed in the second direction DR2.

Although the support bars SB spaced apart from each other are illustrated as an example, the structure of the support bars SB is not limited thereto. For example, the support bars SB may be implemented in a joint structure in which the support bars SB are coupled to rotate relative to each other.

The support film SFL may be disposed between the display module DM and the support plate SSP and between the display module DM and the support bars SB. Based on the second direction DR2, the length of the support film SFL may be smaller than the lengths of the first and second support plates SPP1 and SPP2 and the lengths of the support bars SB.

When viewed in a plan view, the support film SFL may not overlap opposite sides of the support plate SPP in the second direction DR2 and opposite sides of each of the support bars SB in the second direction DR2. Opposite sides of the support film SFL in the second direction DR2 may be spaced apart from the opposite sides of the support plate SPP. Furthermore, the opposite sides of the support film SFL may be spaced apart from the opposite sides of each of the support bars SB. Accordingly, the opposite sides of the support plate SPP and the opposite sides of each of the support bars SB may be exposed without being covered by the support film SFL.

Referring to FIGS. 14A and 14B, the support member SP may be attached to the rear surface of the display module DM. A first adhesive AD1 may be disposed between the support plate SPP and the support film SFL and between the support bars SB and the support film SFL. A second adhesive AD2 may be disposed between the display module DM and the support film SFL.

The support film SFL may be attached to the support plate SPP and the support bars SB by the first adhesive AD1. The display module DM may be attached to the support film SFL by the second adhesive AD2. The adhesives AD1 and AD2 may include a pressure sensitive adhesive. However, embodiments are not limited thereto. For example, the adhesives AD1 and AD2 may include various adhesives.

The support film SFL may have a smaller thickness than the support plate SPP and the support bars SB. The support film SFL may include polyimide, polyethyleneterephthalate, polycarbonate, silicone, or urethane. The support film SFL may provide a flat upper surface on the lower surface of the display module DM.

In case that the support film SFL is not omitted, the display module DM may be disposed on the support bars SB. For example, the display module DM overlapping the spaces between the support bars SB may sag since the support bars SB are spaced apart from each other. Accordingly, the flatness (or surface quality) of the display module DM may be lowered.

However, in an embodiment, the support film SFL may be disposed between the support bars SB and the display module DM and may provide a flat upper surface under the display module DM. The display module DM may be maintained in a flat state by the support film SFL. Accordingly, the surface quality of the display module DM may be improved.

Referring to FIG. 14B, the support bars SB may be spaced apart from each other by a certain gap in a direction. As described above, the support bars SB may be arranged in the first direction DR1. For example, the support plate SPP may also be arranged in the first direction DR1.

For example, the support bars SB may include a first support bar SB1, a second support bar SB2, and a third support bar SB3 that are adjacent to each other.

The first support bar SB1 and the second support bar SB2 may be adjacent to each other, and the second support bar SB2 and the third support bar SB3 may be adjacent to each other. For example, the third support bar SB3 may be spaced apart from the first support bar SB1, and the second support bar SB2 may be disposed between the first support bar SB1 and the third support bar SB3.

A first side SS1 of the first support bar SB1 may face the second support bar SB2, and a second side SS2 of the second support bar SB2 may face the first support bar SB1. For example, the first side SS1 of the first support bar SB1 may face the second side SS2 of the second support bar SB2. For example, magnetic bodies (e.g., magnets) may be disposed on the first side SS1 of the first support bar SB1 and the second side SS2 of the second support bar SB2, and a repulsive force may act between the first side SS1 and the second side SS2. For example, the first side SS1 and the second side SS2 may have the same magnetism (or same polarity).

A third side SS3 of the second support bar SB2 may be opposite to the second side SS2 of the second support bar SB2. The third side SS3 of the second support bar SB2 may face the third support bar SB3, and a fourth side SS4 of the third support bar SB3 may face the second support bar SB2. For example, the third side SS3 of the second support bar SB2 may face the fourth side SS4 of the third support bar SB3. For example, magnetic bodies (e.g., magnets) may be disposed on the third side SS3 of the second support bar SB2 and the fourth side SS4 of the third support bar SB3, and a repulsive force may act between the third side SS3 and the fourth side SS4. For example, the third side SS3 and the fourth side SS4 may have the same magnetism (or same polarity).

The repulsive forces may act between the first support bar SB1 and the second support bar SB2 and between the second support bar SB2 and the third support bar SB3 to prevent the gaps between the support bars SB1, SB2, and SB3 from being narrower than a preset gap. Description thereabout will be provided below with reference to FIG. 19.

The positions of the first support bar SB1, the second support bar SB2, and the third support bar SB3 are not limited to those illustrated in the drawing, and the first support bar SB1, the second support bar SB2, and the third support bar SB3 may be implemented with support bars SB having the same specification.

The magnetic bodies may be electro-permanent magnets or permanent magnets. Although FIG. 14B illustrates one example that the magnetic bodies are permanent magnets, embodiments are not limited thereto, and the magnetic bodies may be electro-permanent magnets and are not limited to any one embodiment.

For example, without being limited to the first to third support bars SB1 to SB3, the support bars SB may further include support bars, such as a fourth support bar adjacent to the third support bar SB3, and are not limited to any one embodiment.

Figure 15A:
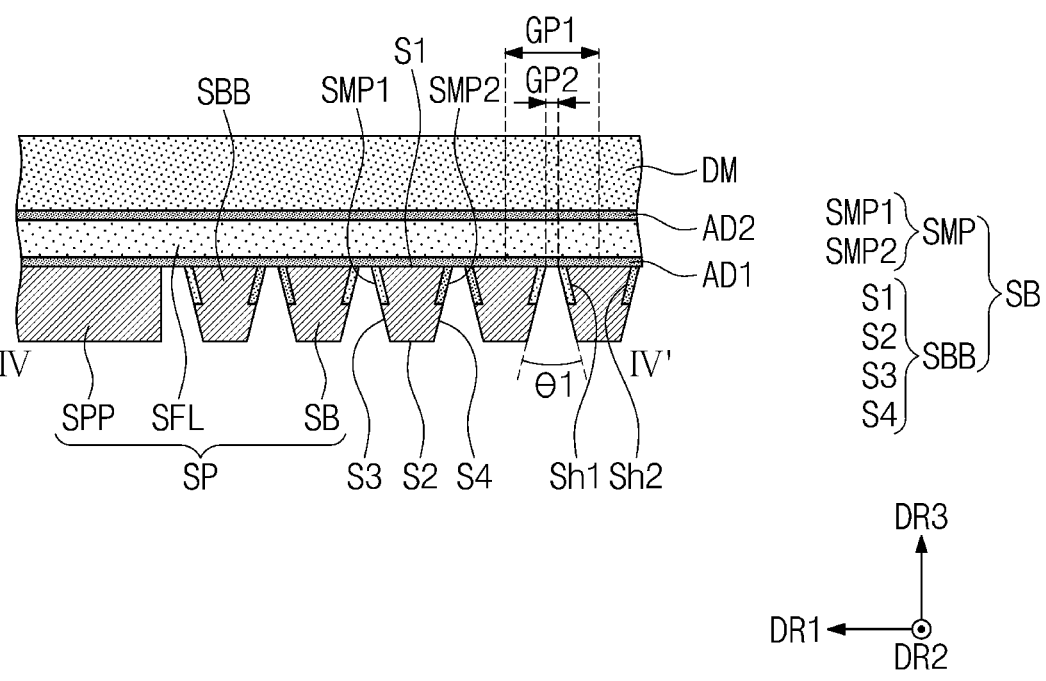
FIGS. 15A to 15D are schematic sectional views taken along line IV-IV' illustrated in FIG. 13.

Referring to FIG. 15A, the support bars SB according to an embodiment may include a magnetic part SMP.

Each of the support bars SB may include a body SBB and magnets SMP1 and SMP2. The body SBB may be disposed under the display module DM or on the support film SFL. The magnets SMP1 and SMP2 may be disposed on the body SBB. For example, the magnets SMP1 and SMP2 may be disposed in grooves formed on the body SBB. The magnets SMP1 and SMP2 may be formed of the above-described magnetic bodies.

The body SBB may include a first surface S1, a second surface S2, a third surface S3, and a fourth surface S4. For example, the first surface S1 may be in contact with the display module DM. The second surface S2 may be opposite to the first surface S1. The third surface S3 and the fourth surface S4 may connect the first surface S1 and the second surface S2 and may be opposite to each other with being bent from the first surface S1 and the second surface S2.

For example, the first surface S1 may be defined as an upper surface of the body SBB. The second surface S2 may be defined as a lower surface of the body SBB. The third surface S3 and the fourth surface S4 may be defined as a side surface and an opposite side surface of the body SBB.

Between a pair of support bars SB adjacent to each other, the third surface S3 of a support bar SB and the fourth surface S4 of another support bar SB may face each other. For example, the third surfaces S3 of the support bars SB may face toward substantially the same direction. The fourth surfaces S4 of the support bars SB may face toward substantially the same direction.

The first side SS1 of the first support bar SB1 and the third side SS3 of the second support bar SB2 described above with reference to FIG. 14B may correspond to the third surfaces S3, and the second side SS2 of the second support bar SB2 and the fourth side SS4 of the third support bar SB3 may correspond to the fourth surfaces S4.

The body SBB may have various shapes. For example, the third surface S3 or the fourth surface S4 may form a right angle or an obtuse angle with the second surface S2, and when viewed in the second direction, the body SBB may have a rectangular shape or an inverted trapezoidal shape.

However, without being limited to the rectangular shape or the inverted trapezoidal shape, the body SBB may have a hexagonal shape and is not limited to any one embodiment.

Furthermore, the gap between the third surface S3 and the fourth surface S4 (e.g., in the first direction DR1) may vary as being farther away from the display module DM. For example, the gap between the third surface S3 and the fourth surface S4 (e.g., in the first direction DR1) may be decreased as being farther away from the display module DM.

However, embodiments are not limited thereto. For example, the gap between the third surface S3 and the fourth surface S4 may be increased and decreased as being farther away from the display module DM and is not limited to any one embodiment.

The magnets SMP1 and SMP2 may be disposed on the body SBB. A repulsive force may act between the magnets SMP1 and SMP2 of the pair of support bars SB (or adjacent support bars SB) that face each other.

For example, the magnet SMP1 of one of the support bars SB adjacent to each other and the magnet SMP2 of the other support bar SB may face each other. For example, a repulsive force may act between the magnets SMP1 and SMP2 facing each other. The magnets SMP1 and SMP2 facing each other may have the same magnetism (or same polarity).

The magnets SMP1 and SMP2 may be disposed on the third surface S3 and the fourth surface S4 of the body SBB. For example, the magnets SMP1 and SMP2 may include the first magnet SMP1 disposed on the third surface S3 of the body SBB and the second magnet SMP2 disposed on the fourth surface S4 of the body SBB. The second magnet SMP2 disposed on the fourth surface S4 of one of the pair of support bars SB adjacent to each other and the first magnet SMP1 disposed on the third surface S3 of the other support bar SB may face each other. For example, a repulsive force may act between the first magnet SMP1 and the second magnet SMP2 that are disposed on the third surface S3 and the fourth surface S4 of the different support bars SB.

A first groove Sh1 and a second groove Sh2 may be formed on the third surface S3 and the fourth surface S4 of the body SBB. The first magnet SMP1 may be disposed in the first groove Sh1, and the second magnet SMP2 may be disposed in the second groove Sh2. The first groove Sh1 and the second groove Sh2 may have a shape corresponding to the first magnet SMP1 and the second magnet SMP2. The first magnet SMP1 may be accommodated in the first groove Sh1 and may not protrude outside the first groove Sh1. For example, a surface of the first magnet SMP1 and the third surface S3 may be coplanar with each other. This configuration may also be applied to a relationship between the second groove Sh2 and the second magnet SMP2. For example, the second magnet SMP2 may be accommodated in the second groove Sh2 and may not protrude outside the second groove Sh2. For example, a surface of the second magnet SMP2 and the fourth surface S4 may be coplanar with each other.

As illustrated in the drawing, the first groove Sh1 and the second groove Sh2 may have a rectangular parallelepiped shape. However, embodiments are not limited thereto. For example, the first groove Sh1 and the second groove Sh2 may have a hemispherical shape and are not limited to any one embodiment.

The first gap GP1 between the center of one of the pair of support bars SB adjacent to each other among the support bars SB and the center of the other support bar SB may be set to about 1.3 mm to about 2 mm.

The second gap GP2 between surfaces of the pair of support bars SB adjacent to each other may be set to about 0.5 mm to about 1.0 mm. However, embodiments are not limited thereto. For example, the first gap GP1 or the second gap GP2 between the pair of support bars SB may be diversely provided and is not limited to any one embodiment.

Furthermore, the angle $\theta 1$ formed by the fourth surface S4 of one of the pair of support bars SB adjacent to each other and the third surface S3 of the other support bar SB may range from about 25 degrees to about 60 degrees.

Figure 15B:
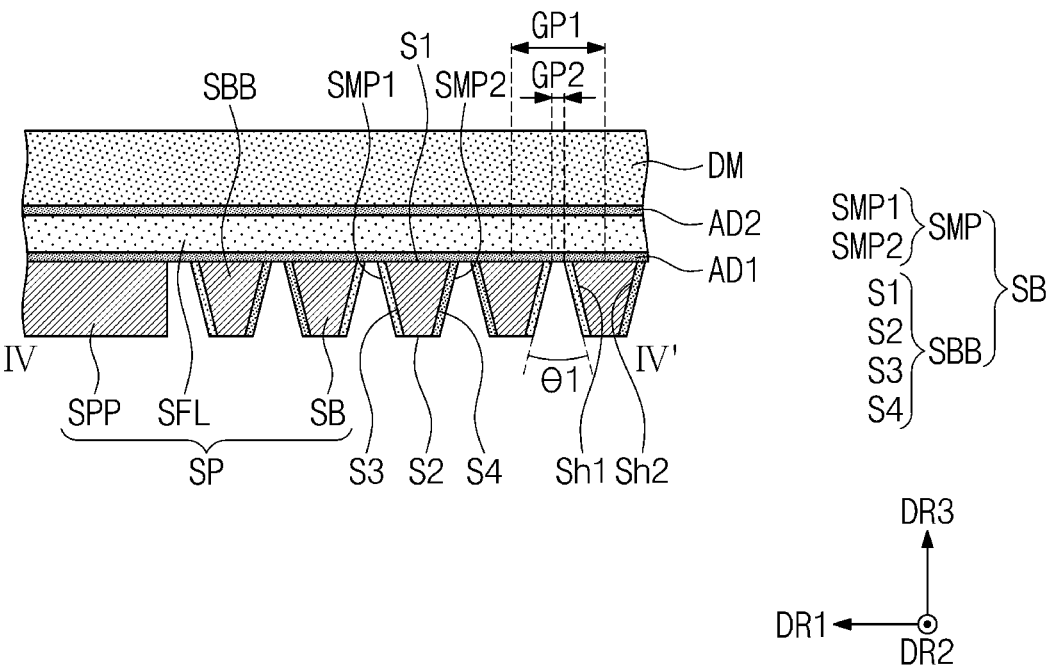

Referring to FIG. 15B, a first groove Sh1, a second groove Sh2, a first magnet SMP1, and a second magnet SMP2 of a support bar SB according to an embodiment may be longer than the first groove Sh1, the second groove Sh2, the first magnet SMP1, and the second magnet SMP2 of FIG. 15A.

For example, components identical to the components described with reference to FIG. 15A will be assigned with identical reference numerals, and redundant descriptions will be omitted.

For example, the first magnet SMP1 may extend in an extension direction of a third surface S3, and the second magnet SMP2 may extend in an extension direction of a fourth surface S4. Correspondingly, the first groove Sh1 may be recessed in the extension direction of the third surface S3, and the second groove Sh2 may be recessed in the extension direction of the fourth surface S4.

Figure 15C:
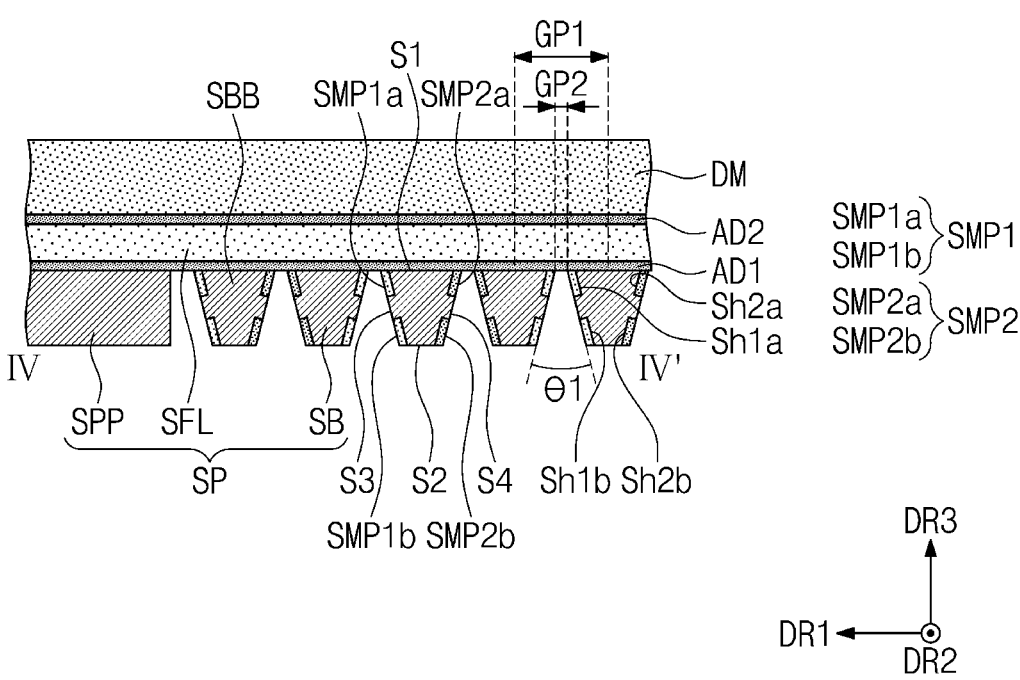

Referring to FIG. 15C, first and second magnets of a support bar according to an embodiment may include magnetic bodies.

Magnets SMP1 and SMP2 may include magnetic bodies. For example, the first magnet SMP1 disposed on a third surface S3 may include magnetic bodies SMP1$a$ and SMP1$b$, and the second magnet SMP2 disposed on a fourth surface S4 may include magnetic bodies SMP2$a$ and SMP2$b$. For example, as illustrated in the drawing, the first magnet SMP1 may include the first magnetic body SMP1$a$ and the second magnetic body SMP1$b$ spaced apart from each other in an extension direction of the third surface S3, and the second magnet SMP2 may include the third magnetic body SMP2$a$ and the fourth magnetic body SMP2$b$ spaced apart from each other in an extension direction of the fourth surface S4. However, without being limited to that illustrated in the drawing, each of the first magnet SMP1 and the second magnet SMP2 may include three or more magnetic bodies and is not limited to any one embodiment.

For example, the first magnetic body SMP1$a$ and the second magnetic body SMP1$b$ of the first magnet SMP1 disposed on the third surface S3 may have the same magnetism (or same polarity). However, embodiments are not limited thereto, and the magnetism of the first magnetic body SMP1$a$ and the magnetism of the second magnetic body SMP1$b$ may differ from each other. This configuration may also be applied to the magnetic bodies SMP2$a$ and SMP2$b$ of the second magnet SMP2 disposed on the fourth surface S4.

Figure 15D:
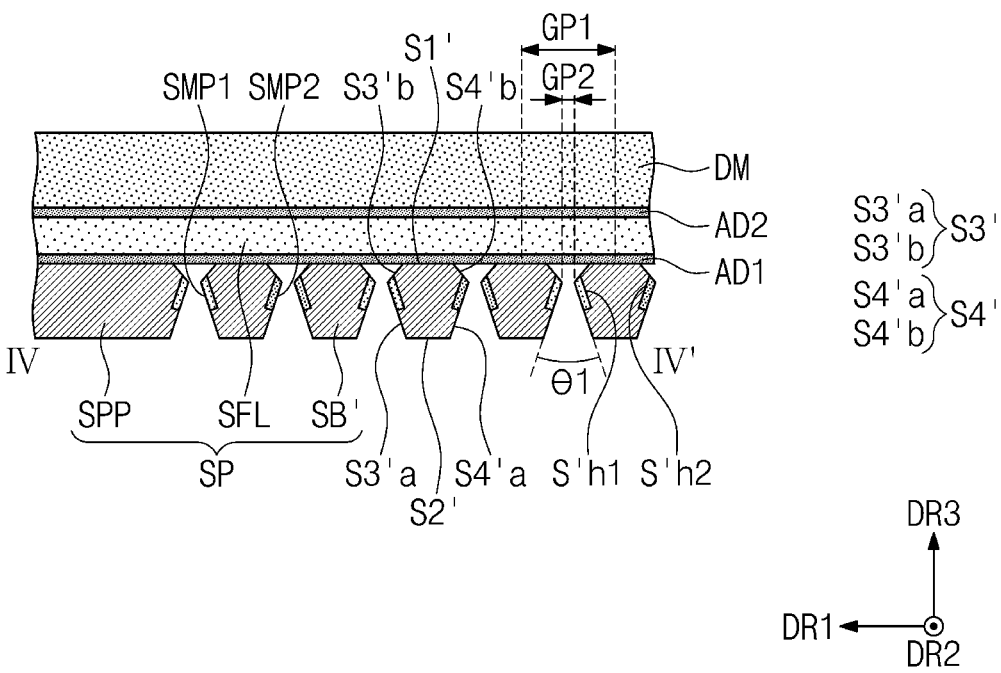

Referring to FIG. 15D, support bars SB according to an embodiment may have a hexagonal shape when viewed in the second direction DR2.

For example, a second surface S2' and a first connecting part S3'$a$ may form an obtuse angle, and the second surface S2' and a third connecting part S4'$a$ may form an obtuse angle. For example, a first surface S1' and a second connecting part S3'$b$ may form an obtuse angle, and the first surface S1' and a fourth connecting part S4'$b$ may form an obtuse angle. For example, the second connecting part S3'$b$ may be inclined (or bent) from the first connecting part S3'$a$. Furthermore, the first connecting part S3'$a$ and the second connecting part S3'$b$ may form an obtuse angle, and the third connecting part S4'$a$ and the fourth connecting part S4'$b$ may form an obtuse angle. For example, the fourth connecting part S4'$b$ may be inclined (or bent) from the third connecting part S4'$a$. Accordingly, each of the support bars SB may have a hexagonal shape when viewed in the second direction. For example, based on the first direction DR1, the second surface S2' may have a length greater than or substantially equal to the length of the first surface S1'.

A first groove S'h1 and a second groove S'h2 may be formed on the third surface S3' and the fourth surface S4'.

However, without being limited to that illustrated in the drawing, the support bars SB may have various shapes as described above and are not limited to any one embodiment.

Figure 16:
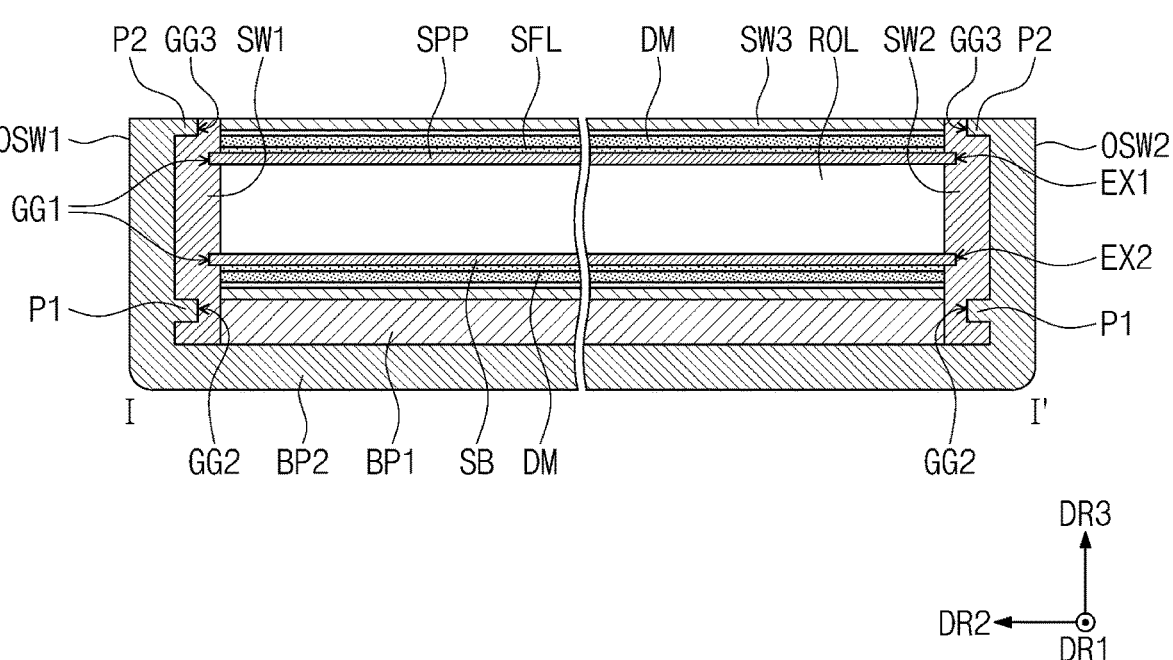
FIGS. 16, 17, and 18 are schematic views illustrating the display module and the support member disposed in the first and second cases.
Figure 17:
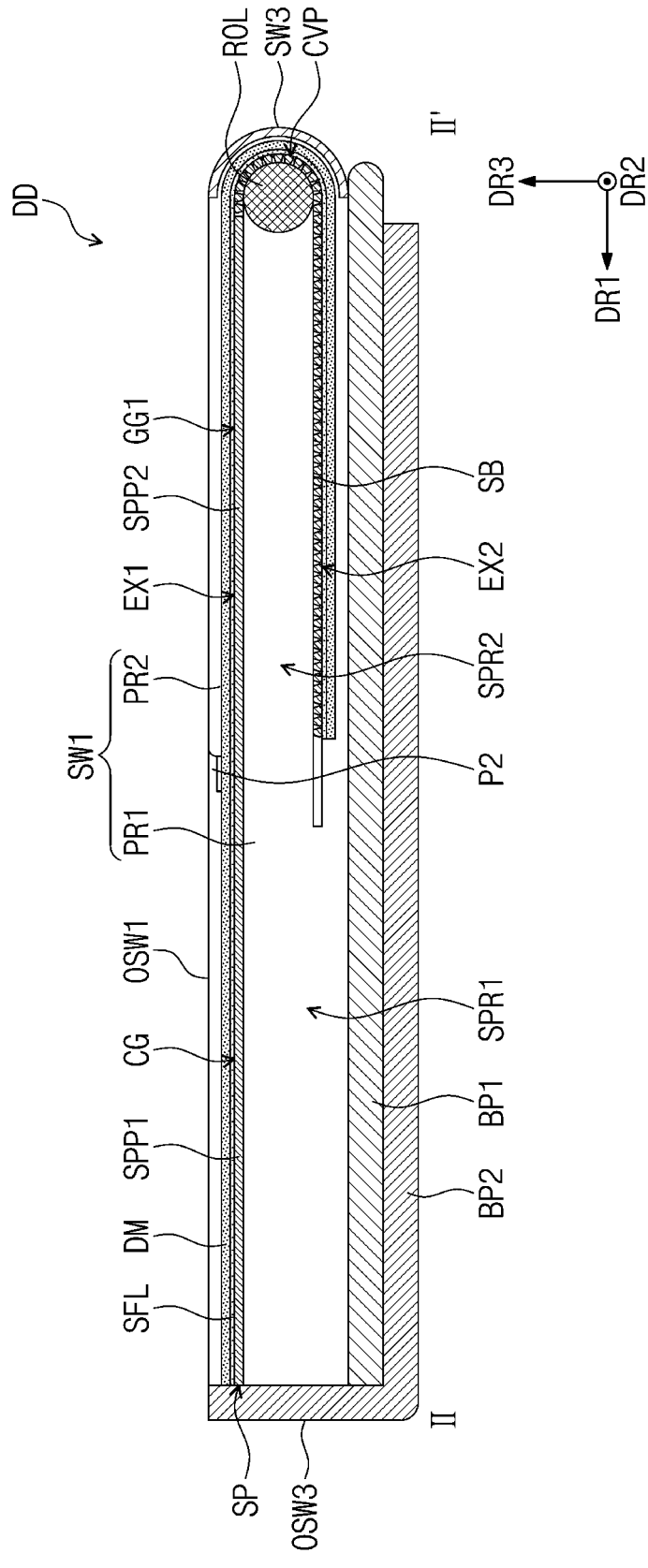
Figure 18:
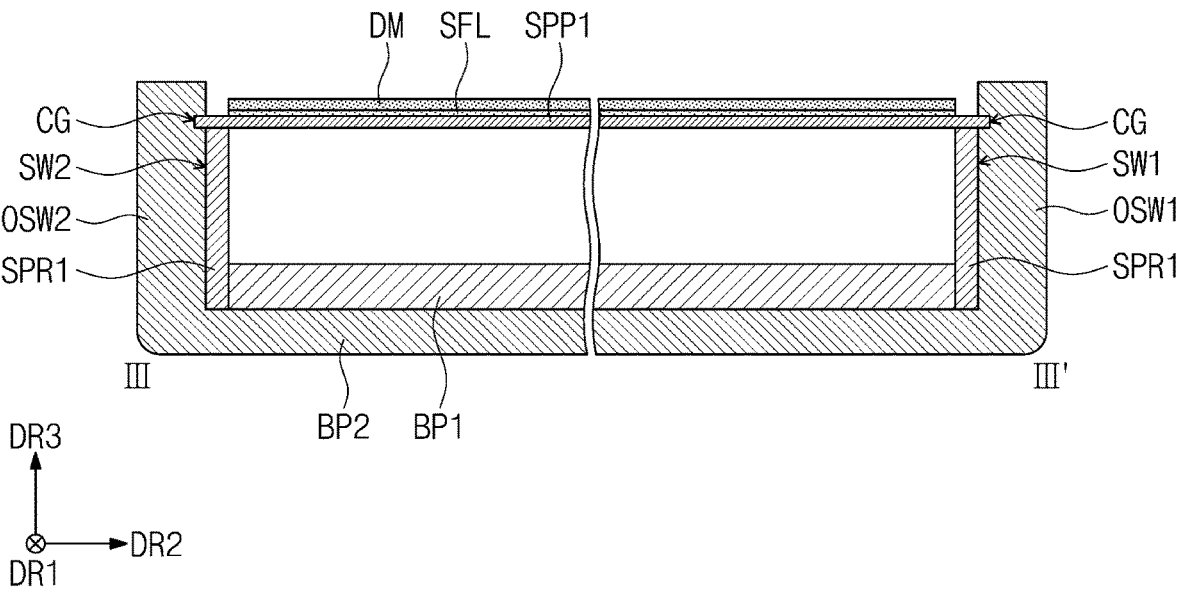
Figure 19A:
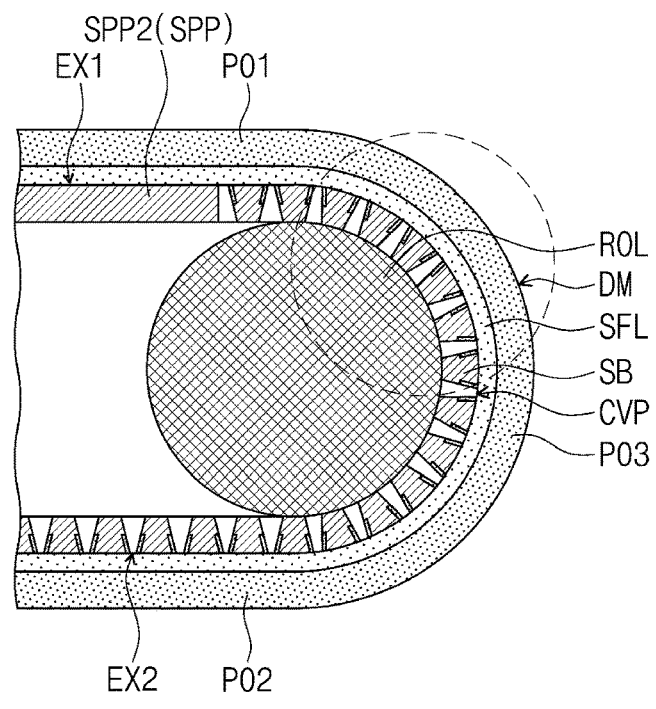
FIGS. 19A and 19B are schematic enlarged views of support bars disposed in a curved groove portion and the roller illustrated in FIG. 17.
Figure 19B:
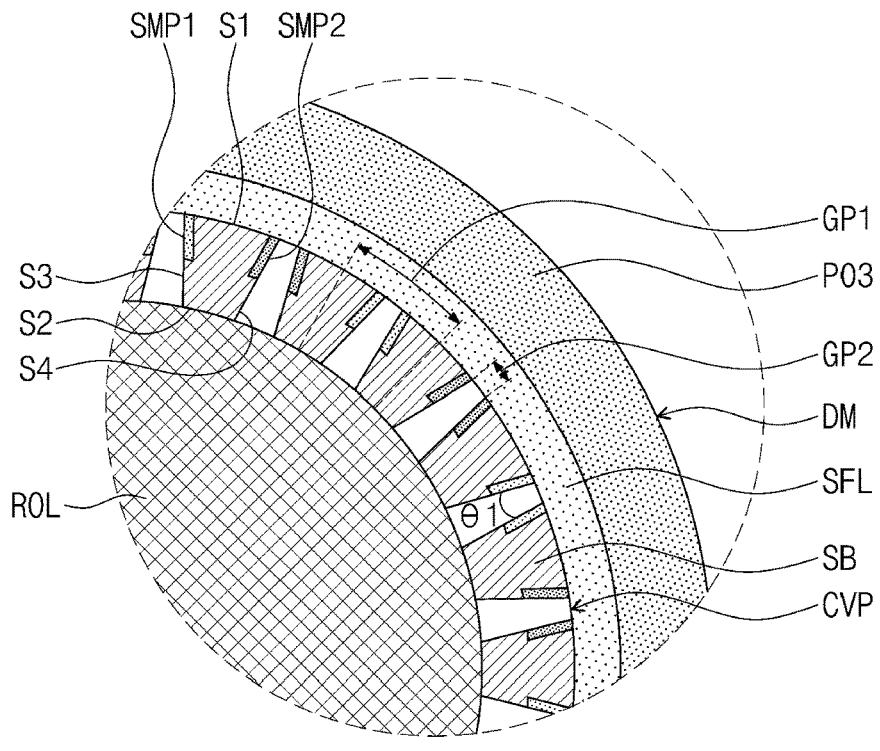

FIGS. 16, 17, and 18 are schematic views illustrating the display module and the support member disposed in the first and second cases. FIGS. 19A and 19B are schematic enlarged views of the support bars disposed in the curved groove portion and the roller illustrated in FIG. 17.

FIG. 16 is a schematic sectional view substantially corresponding to FIG. 10, FIG. 17 is a schematic sectional view substantially corresponding to FIG. 11, and FIG. 18 is a schematic sectional view substantially corresponding to FIG. 12.

Referring to FIGS. 16 and 17, a portion of the front surface of the display module DM that is adjacent to the periphery of the first case CS1 may be exposed to the outside through the opening OP illustrated in FIG. 1. The front surface of the display module DM may be an image display surface. The support member SP may be connected to the second case CS2, and the opposite sides of the support member SP that are opposite each other in the second direction DR2 may be inserted into the first guide grooves GG1 and may move in the first direction DR1.

Referring to FIGS. 17 and 18, the support plate SPP may be connected to the second case CS2. For example, as illustrated in FIG. 18, the opposite sides of the first support plate SPP1 that are opposite to each other in the second direction DR2 may be inserted into the connecting grooves CG and may be connected to the second case CS2. Portions of the first support plate SPP1 that are adjacent to the opposite sides of the first support plate SPP1 may be disposed on the first sub-frames SPR1 of the first and second sidewalls SW1 and SW2.

Referring to FIGS. 16 and 17, based on the second direction DR2, the length of the display module DM may be smaller than the length of the second support plate SPP2. Since the length of the second support plate SPP2 is substantially equal to the length of each of the support bars SB, the length of the display module DM may be smaller than the length of each of the support bars SB, based on the second direction DR2.

The display module DM and the support film SFL may not be inserted into the first guide grooves GG1. The display module DM and the support film SFL may be disposed between the first sidewall SW1 and the second sidewall SW2.

The state of the display device DD illustrated in FIG. 17 may correspond to the default mode (or non-extended mode) of the display device DD. In the default mode of the display device DD, the opposite sides of the support plate SPP may be disposed in the first extension groove portions EX1. For example, the opposite sides of the second support plate SPP2 that are opposite to each other in the second direction DR2 may be inserted into the first extension groove portions EX1. In the default mode of the display device DD, the opposite sides of each of the support bars SB in the second direction DR2 may be inserted into the second extension groove portions EX2 and the curved groove portions CVP.

According to the arrangement of the support member SP described above, the display module DM and the support film SFL may be accommodated in the first and second cases CS1 and CS2 in the state of being folded along the curved groove portion CVP. For example, a portion of the display module DM and a portion of the support film SFL that are on the support bars SB disposed in the curved groove portion CVP may be folded. A portion of the display module DM disposed on the support plate SPP may be exposed to the outside through the opening OP illustrated in FIG. 1, and a portion of the display module DM disposed on the support bars SB may not be exposed to the outside.

Referring to FIGS. 19A and 19B, the display module DM may include the first portion P01, the second portion P02 disposed under the first portion P01, and the third portion P03 disposed between the first portion P01 and the second portion P02 and bent.

The support plate SPP may be disposed on the rear surface of the first portion P01. The support bars SB may be disposed on the rear surface of the second portion P02 and the rear surface of the third portion P03 and may be spaced apart from each other by a certain gap in a direction.

The roller ROL may rotate to move the support bars SB disposed in the curved groove portions CVP. For example, the outer circumferential surface of the roller ROL may be in contact with the second surfaces S2 of the support bars SB. According to the rotation of the roller ROL, the support bars SB may be moved by a frictional force. The roller ROL may include rubber.

A repulsive force may act between the support bars SB disposed in the curved groove portions CVP. As described above with reference to FIG. 15, each of the support bars SB may include the magnets SMP1 and SMP2. By maintaining a certain gap by the repulsive force generated between the magnets SMP1 and SMP2 of the support bars SB adjacent to each other, a crease (or wrinkles) on a surface of the display module DM or the support film SFL may be prevented. For example, the certain gap may be the first gap GP1 or the second gap GP2.

For example, in the first extension groove portion EX1 or the second extension groove portion EX2, the first gap GP1 between the center of one of a pair of support bars SB adjacent to each other among the support bars SB and the center of the other support bar SB may be set to about 1.3 mm to about 2 mm. In the description, through the repulsive force between the adjacent support bars SB, the first gap GP1 between the centers of the support bars SB may be maintained at a preset value of about 1.3 mm to about 2 mm even in the curved groove portion CVP.

The second gap GP2 between surfaces of the pair of support bars SB adjacent to each other may be set to about 0.5 mm to about 1.0 mm. In the description, through the repulsive force between the adjacent support bars SB, the second gap GP2 between the surfaces of the support bars SB may be maintained at a preset value of about 0.5 mm to about 1.0 mm even in the curved groove portion CVP.

However, embodiments are not limited thereto. For example, the first gap GP1 and the second gap GP2 between the pair of support bars SB (or adjacent support bars SB) may be diversely provided and are not limited to any one embodiment.

Furthermore, the angle θ1 formed by facing surfaces of the pair of support bars SB adjacent to each other may range from about 25 degrees to about 60 degrees. In the description, through the repulsive force between the adjacent support bars, the angle θ1 formed by the facing surfaces of the pair of support bars SB adjacent to each other may be maintained at a preset value of about 25 degrees to about 60 degrees.

For example, since the repulsive force is generated between the pair of support bars SB adjacent to each other, the adjacent support bars SB may not interfere with each other. For example, interference due to a collision between one of the pair of support bars SB adjacent to each other and a facing surface of the other support bar SB opposite to the one of the pair of support bars SB (or adjacent support bars SB) may be prevented. Accordingly, the durability of the support bars SB may be increased, and the cases CS1 and CS2 (refer to FIGS. 1 and 2) may smoothly slide relative to each other.

Figure 20:
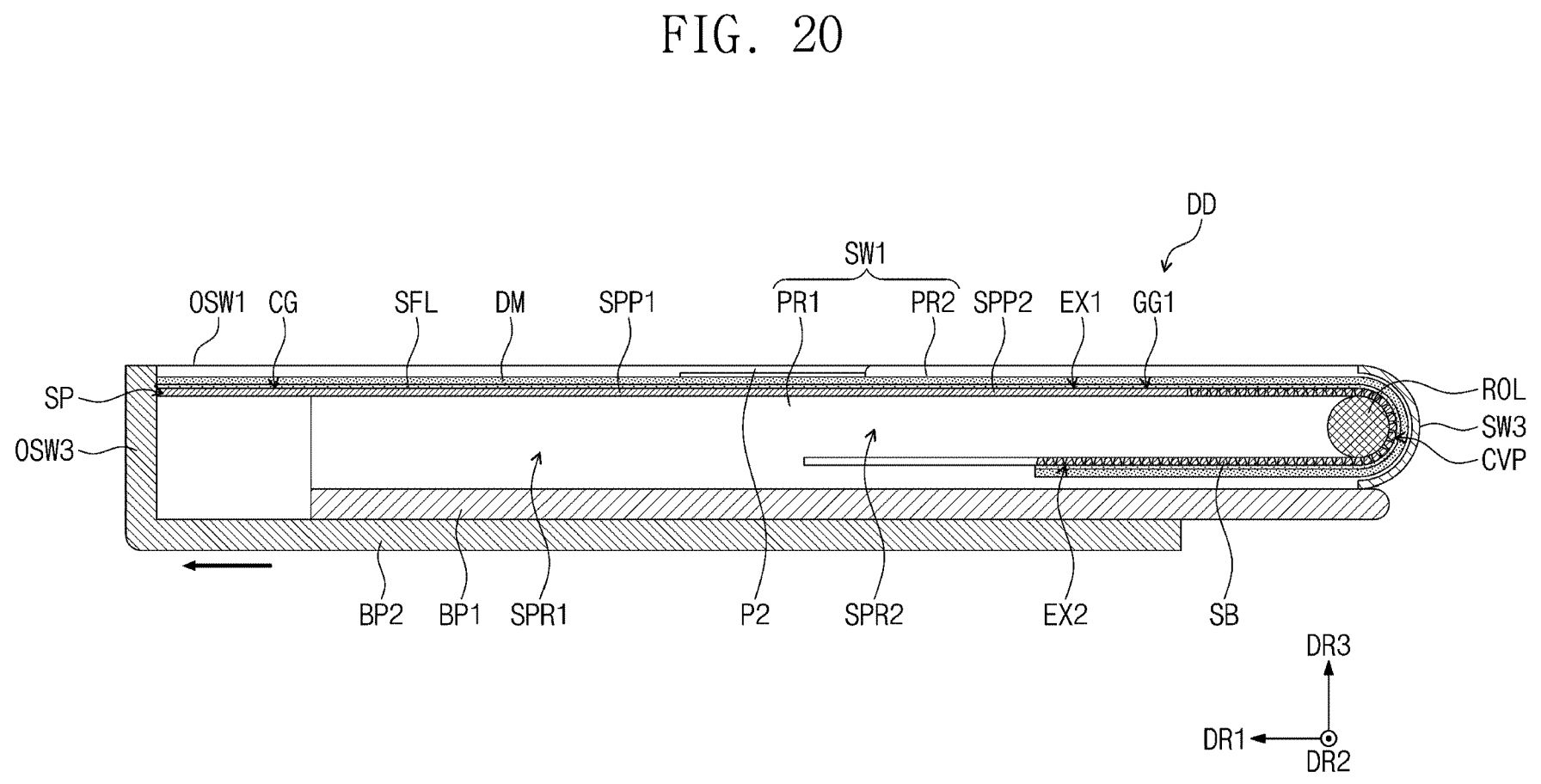

FIG. 20 is a schematic view illustrating the extended mode of the display device illustrated in FIG. 17.

Referring to FIG. 20, the support member SP may move along the first guide groove GG1 in case that the second case CS2 moves away from the first case CS1 in the first direction DR1 for the extended mode of the display device DD. The first support plate SPP1 may be connected to the second case CS2 and may move in the first direction DR1 along the second case CS2, and the second support plate SPP2 and the support bars SB may move along the first guide groove GG1. The roller ROL may move the support bars SB along the first guide groove GG1 with rotating.

The second case CS2 may move in various ways. For example, the second case CS2 may be moved by an actuator that rotates the roller ROL. The roller ROL may be rotated in the clockwise or counterclockwise direction by the actuator, and the support bars SB may be moved by the roller ROL. Furthermore, the second case CS2 may be moved by the user's force. The extended area of the display module DM may be determined according to the amount of movement of the second case CS2.

In the extended mode, some of the support bars SB may move along the curved groove portion CVP and may be disposed in a portion of the first extension groove portion EX1 adjacent to the curved groove portion CVP. The support bars SB disposed in the first extension groove portion EX1 may support the display module DM. The support film SFL may support the display module DM from below the display module DM and may maintain the display module DM in a flat state.

As a result, the display device DD according to an embodiment may improve the surface quality of the display module DM.

The display device according to the embodiments may improve the surface quality of the display module.

In concluding the detailed description, those skilled in the art will appreciate that many variations and modifications may be made to the embodiments without substantially departing from the principles and spirit and scope of the disclosure. Therefore, the disclosed embodiments are used in a generic and descriptive sense only and not for purposes of limitation.

What is claimed is:

1. A display device comprising:
    a display module; and
    a plurality of support bars on the display module and spaced apart by a gap,
    wherein each of the plurality of support bars comprises:
        a body comprising:
            a first surface in contact with the display module,
            a second surface opposite to the first surface, and
            a third surface and a fourth surface that are opposite to each other, connect the first surface and the second surface, and are inclined from the first surface and the second surface;
        a first magnet on the third surface, the first magnet comprising an inner inclined side surface extending from the first surface and an upper surface being coplanar with the first surface; and
        a second magnet on the fourth surface, the second magnet comprising an inner inclined side surface extending from the first surface and an upper surface being coplanar with the first surface, wherein a gap between the inner inclined side surface of the first magnet and the inner inclined side surface of the second magnet decreases as being farther away from the display module, and wherein magnets of adjacent support bars of the plurality of support bars are configured to generate a repulsive force therebetween.

2. The display device of claim 1, wherein the magnets of the adjacent support bars of the plurality of support bars have a same magnetism.

3. The display device of claim 1, wherein the inner inclined side surface of the first magnet is in a first groove on the third surface, and wherein the inner inclined side surface of the second magnet is in a second groove on the fourth surface.

4. The display device of claim 3, wherein the first magnet comprises a first magnetic body and a second magnetic body spaced apart in an extension direction of the third surface, and wherein the second magnet comprises a third magnetic body and a fourth magnetic body spaced apart in an extension direction of the fourth surface.

5. The display device of claim 1, wherein a gap between the third surface and the fourth surface varies as being farther away from the display module.

6. The display device of claim 1, wherein the third surface or the fourth surface forms a right angle or an obtuse angle with the second surface.

7. A display device comprising:

a display module; and a plurality of support bars on the display module and spaced apart by a gap, wherein each of the plurality of support bars comprises:

a body comprising:

a first surface in contact with the display module, a second surface opposite to the first surface, a third surface and a fourth surface that are opposite to each other, connect the first surface and the second surface, and are inclined from the first surface and the second surface; and a magnet on the third surface or the fourth surface, and wherein magnets of adjacent support bars of the plurality of support bars are configured to generate a repulsive force therebetween, wherein the third surface or the fourth surface forms a right angle or an obtuse angle with the second surface, wherein the third surface comprises:

a first connecting part connected to the second surface; and a second connecting part connecting the first connecting part and the first surface, the second connecting part being inclined from the first connecting part, and wherein the fourth surface comprises:

a third connecting part connected to the second surface; and a fourth connecting part connecting the third connecting part and the first surface, the fourth connecting part being inclined from the third connecting part.

8. The display device of claim 1, further comprising:

a support film between the display module and the plurality of support bars.

9. The display device of claim 1, further comprising:

a support plate on the display module and to be adjacent to the plurality of support bars.

10. A display device comprising:

a display module;

a support plate under the display module;

a plurality of support bars under the display module and adjacent to the support plate, the plurality of support bars spaced apart;

a first case that accommodates the display module, the support plate, and the plurality of support bars; and a second case coupled with the first case to move away from or toward the first case in a direction intersecting an extension direction of the plurality of support bars, wherein the plurality of support bars comprise a first support bar and a second support bar adjacent to each other, wherein the first support bar comprises a first side facing the second support bar, wherein the second support bar comprises a second side facing the first support bar, and wherein the first side and the second side are configured to generate a repulsive force therebetween, wherein opposite sides of each of the plurality of support bars are inserted into first guide grooves formed on inside surfaces of the first case facing each other in the extension direction of the plurality of support bars, wherein the plurality of support bars are movable along the first guide grooves, and wherein each of the first guide grooves comprises:

a first extension groove portion extending in the direction intersecting the extension direction of the plurality of support bars;

a second extension groove portion extending in the direction and under the first extension groove portion; and a curved groove portion extending from the first extension groove portion to the second extension groove portion.

11. The display device of claim 10, wherein the plurality of support bars further comprise a third support bar spaced apart from the first support bar, the second support bar between the first support bar and the third support bar, wherein the second support bar further comprises a third side opposite to the second side and facing the third support bar, wherein the third support bar comprises a fourth side facing the second support bar, and wherein the third side and the fourth side are configured to generate a repulsive force therebetween.

12. The display device of claim 11, wherein the first side and the second side have a same magnetism, and wherein the third side and the fourth side have a same magnetism.

13. The display device of claim 10, wherein the support plate is connected to the second case, wherein opposite sides of the support plate are inserted into the first extension groove portions of the first guide grooves, and wherein the opposite sides of each of the plurality of support bars are inserted into the curved groove portions and the second extension groove portions of the first guide grooves.

14. The display device of claim 13, further comprising:

a roller coupled to the first case and being rotatable, wherein the roller is between the first extension groove portion and the second extension groove portion and is rotatable with being in contact with the plurality of support bars.

15. The display device of claim 14, further comprising:
a support film between the display module and the plurality of support bars.

16. A display device comprising:
a display module comprising:
 a first portion,
 a second portion under the first portion, and
 a third portion between the first portion and the second portion, the third portion being bent;
a support plate on a rear surface of the first portion;
a plurality of support bars on a rear surface of the second portion and a rear surface of the third portion, the plurality of support bars spaced apart by a gap;
a first case that accommodates the display module, the support plate, and the plurality of support bars; and
a second case coupled with the first case to move away from or toward the first case in a direction intersecting an extension direction of the plurality of support bars,
wherein each of the plurality of support bars comprises:
 a body comprising:
  a first surface in contact with the display module,
  a second surface opposite to the first surface, and
  a third surface and a fourth surface that connect the first surface and the second surface, and are inclined from the first surface and the second surface,
 a first magnet on the third surface, the first magnet comprising an inner inclined side surface extending from the first surface and an upper surface being coplanar with the first surface, and
 a second magnet on the fourth surface, the second magnet comprising an inner inclined side surface extending from the first surface and an upper surface being coplanar with the first surface,
wherein a gap between the inner inclined side surface of the first magnet and the inner inclined side surface of the second magnet decreases as being farther away from the display module, and
wherein magnets of adjacent support bars are configured to generate a repulsive force therebetween.

17. The display device of claim 16,
wherein the magnets of the adjacent support bars face each other and have a same magnetism.

18. The display device of claim 17, wherein a gap between the third surface and the fourth surface varies as being farther away from the display module.

19. An electronic device for providing an image comprising:
a display device comprising:
a display module; and
a plurality of support bars on the display module and spaced apart by a gap,
wherein each of the plurality of support bars comprises:
 a body comprising:
  a first surface in contact with the display module,
  a second surface opposite to the first surface, and
  a third surface and a fourth surface that are opposite to each other, connect the first surface and the second surface, and are inclined from the first surface and the second surface, at least one of the third surface and the fourth surface comprising a groove and a flat portion; and
 a first magnet on the third surface, the first magnet comprising an inner inclined side surface extending from the first surface and an upper surface being coplanar with the first surface; and
 a second magnet on the fourth surface, the second magnet comprising an inner inclined side surface extending from the first surface and an upper surface being coplanar with the first surface,
wherein a gap between the inner inclined side surface of the first magnet and the inner inclined side surface of the second magnet decreases as being farther away from the display module, and
wherein magnets of adjacent support bars of the plurality of support bars are configured to generate a repulsive force therebetween.

\* \* \* \* \*